US012325324B1

(12) United States Patent
Bennett et al.

(10) Patent No.: US 12,325,324 B1
(45) Date of Patent: Jun. 10, 2025

(54) DIRECT CURRENT FAST CHARGING COOLING CONTROL

(71) Applicant: Rivian IP Holdings, LLC, Irvine, CA (US)

(72) Inventors: Tyler Jennings Bennett, Long Beach, CA (US); Won Tae Joe, Irvine, CA (US); Kok Wei Koh, Mountain View, CA (US)

(73) Assignee: Rivian IP Holdings, LLC, Irvine, CA (US)

( * ) Notice: Subject to any disclaimer, the term of this patent is extended or adjusted under 35 U.S.C. 154(b) by 0 days.

(21) Appl. No.: 18/585,892

(22) Filed: Feb. 23, 2024

(51) Int. Cl.
| | | |
|---|---|---|
| *H02J 7/00* | (2006.01) | |
| *B60L 53/302* | (2019.01) | |
| *B60L 53/66* | (2019.01) | |
| *B60L 58/13* | (2019.01) | |
| *B60L 58/33* | (2019.01) | |
| *H02J 7/14* | (2006.01) | |

(52) U.S. Cl.
CPC .............. *B60L 58/13* (2019.02); *B60L 53/302* (2019.02); *B60L 53/66* (2019.02); *B60L 58/33* (2019.02)

(58) Field of Classification Search
CPC ........ B60L 58/13; B60L 58/302; B60L 58/66; B60L 58/33
USPC ....................................................... 320/104
See application file for complete search history.

(56) References Cited

U.S. PATENT DOCUMENTS

| | | | | |
|---|---|---|---|---|
| 5,982,152 A | * | 11/1999 | Watanabe | ................. B60L 3/12 320/137 |
| 6,188,202 B1 | * | 2/2001 | Yagi | ................... H02J 7/007184 320/125 |
| 6,281,663 B1 | * | 8/2001 | Yagi | ........................ B60L 53/11 320/150 |
| 6,434,453 B1 | * | 8/2002 | Kuroda | ............... B60L 15/2045 903/917 |
| 6,624,615 B1 | * | 9/2003 | Park | ........................ B60L 53/11 320/150 |
| 8,395,355 B2 | * | 3/2013 | Kaita | ..................... H02J 7/0049 180/68.5 |
| 2010/0019729 A1 | * | 1/2010 | Kaita | ..................... H02J 7/1423 320/134 |
| 2010/0072954 A1 | * | 3/2010 | Kohn | ................ H02J 7/007194 320/152 |
| 2010/0107608 A1 | * | 5/2010 | Mitsutani | ................ B60L 50/16 60/299 |

(Continued)

*Primary Examiner* — Alexis B Pacheco
(74) *Attorney, Agent, or Firm* — Foley & Lardner LLP

(57) ABSTRACT

Technical solutions provide a model-based cooling control of an EV battery during a direct current fast charging (DCFC) event. The technical solutions can include a processor coupled with memory to identify a state of charge (SOC), a temperature threshold and a gradient threshold for a difference in temperature between at least two cells of an EV battery. The processor can determine an amount of cooling to apply during a charge of the battery based at least on the SOC, the temperature of the battery and the difference in temperature input into a model for cooling the battery to maintain the temperature below the temperature threshold and the difference in temperature below the gradient threshold. The processor can provide to the battery the amount of cooling determined by the model to maintain the temperature below the temperature threshold and the difference in temperature below the gradient threshold during the charge.

20 Claims, 12 Drawing Sheets

(56) References Cited

U.S. PATENT DOCUMENTS

| | | | | |
|---|---|---|---|---|
| 2010/0121513 | A1* | 5/2010 | Itoh | B60L 58/27 |
| | | | | 180/65.265 |
| 2013/0035815 | A1* | 2/2013 | Ando | B60W 10/06 |
| | | | | 180/65.265 |
| 2014/0023905 | A1* | 1/2014 | Taniyama | H01M 10/482 |
| | | | | 429/120 |
| 2014/0121869 | A1* | 5/2014 | Lee | H01M 10/625 |
| | | | | 701/22 |
| 2015/0145442 | A1* | 5/2015 | Miyamoto | B60W 10/08 |
| | | | | 318/98 |
| 2019/0193522 | A1* | 6/2019 | Takeuchi | B60L 7/14 |
| 2019/0315243 | A1* | 10/2019 | Kodera | B60L 7/10 |
| 2021/0122263 | A1* | 4/2021 | Dziubinschi | H01M 10/613 |
| 2021/0284039 | A1* | 9/2021 | Ando | H04W 4/44 |
| 2024/0083276 | A1* | 3/2024 | Rosenblatt | H02J 7/007194 |
| 2024/0109458 | A1* | 4/2024 | Ahmed | H01M 10/441 |

* cited by examiner

DIRECT CURRENT FAST CHARGING COOLING CONTROL

INTRODUCTION

Electric vehicles (EVs) can be powered using batteries that store energy. As EVs are operated over time, the batteries can be discharged. In order to recharge the EV batteries, EV operators can utilize EV charging stations.

SUMMARY

When charging an EV battery at charging stations, heat can be produced within the battery. This heat, unless dissipated, can impact the longevity and performance of the battery. To maintain the performance and longevity of the battery, this technical solution can establish and maintain two battery temperature thresholds: the maximum battery derate threshold for the maximum battery temperature and the maximum gradient derate threshold for the gradient temperature across different parts of the battery (e.g., battery cells). When either of these thresholds are exceeded, the EV can derate the charging current to reduce the temperature. However, charging the EV at a reduced charge current can increase the duration to charge the EV, which can be undesirable to the EV operators who prefer to complete their EV charging within a shorter time period. Such shorter EV charging can include using a high-power direct current delivered to the battery, such as during a direct current fast charging (DCFC) charge event. Accordingly, it can be challenging to strike a balance between maximizing the EV battery charge current via DCFC to shorten the duration of the charge event, while at the same time maintaining the battery temperature levels below the maximum temperature and gradient temperate derate thresholds. The current technical solutions overcome these challenges using a battery cooling model to determine a specific amount of cooling to provide to the battery experiencing heating due to the DCFC to maintain both the battery temperature and the gradient temperature of the battery below the respective derate thresholds.

At least one aspect of the technical solutions is directed to a system. The system can include at least one processor coupled with memory to identify a state of charge (SOC) of a battery of an electric vehicle, a temperature threshold for a temperature of the battery and a gradient threshold for a difference in temperature between at least two cells of the battery. The at least one processor can determine an amount of cooling to apply during a charge of the battery based at least on the SOC, the temperature of the battery and the difference in temperature input into a model for cooling the battery to maintain the temperature below the temperature threshold and the difference in temperature below the gradient threshold. The at least one processor can provide to the battery the amount of cooling determined by the model to maintain the temperature below the temperature threshold and the difference in temperature below the gradient threshold during the charge.

The system can include at least one processor to identify a target SOC to achieve at an end of the charge of the battery. The at least one processor can determine the amount of cooling to apply during the charge of the battery to achieve the target SOC. The at least one processor can determine a time during the charge of the battery at which to apply the amount of cooling to minimize a duration of the charge of the battery and provide to the battery, during the charge of the battery, the amount of cooling at the determined time to achieve the target SOC at the end of the charge of the battery.

The eat least one processor can be configured to determine the amount of cooling based at least on an amount of flow of a coolant to apply during the charge. The at least one processor can be configured to determine a time at which to provide the amount of cooling during the charge of the battery, and provide to the battery, during the charge and at the determined time, the amount of flow of the coolant determined by the model. The at least one processor can be configured to determine the amount of cooling based at least on a temperature of the coolant to apply during the charge, and cause a cooler to provide to the battery, during the charge, the coolant at the temperature of the coolant determined by the model.

The system can include at least one processor to determine, using the model, a time to provide the amount of cooling to the battery to minimize a duration of the charge of the battery, and cause a cooler to provide to the battery the amount of coolant at the time determined using the model. The at least one processor can be configured to receive from a battery management system a setpoint for cooling a cell of the at least two cells and determine the amount of cooling based at least on the setpoint.

The at least two cells of the battery can comprise a first cell of a plurality of cells of the battery having a first temperature that is lower than each temperature of each other cell of the plurality of cells. The at least two cells of the battery can comprise a second cell of the plurality of cells having a second temperature that is higher than each temperature of the each other cell of the plurality of cells of the battery. The at least one processor can be configured to determine an amount of current at which to charge the battery based at least on the amount of cooling and set the current at which to charge the battery according to the determined amount.

At least one aspect of the technical solutions is directed to a method. The method can include identifying, by one or more processors coupled with memory, a state of charge (SOC) of a battery of an electric vehicle, a temperature threshold for a temperature of the battery and a gradient threshold for a difference in temperature between at least two cells of the battery. The method can include the one or more processors determining an amount of cooling to apply during a charge of the battery based at least on the SOC, the temperature of the battery and the difference in temperature input into a model for cooling the battery to maintain the temperature below the temperature threshold and the difference in temperature below the gradient threshold. The method can include the one or more processors providing, to the battery, the amount of cooling determined by the model. The method can include the one or more processors maintaining the temperature of the battery below the temperature threshold and the difference in temperature between the at least two cells of the battery below the gradient threshold during the charge.

The method can include the one or more processors identifying a target SOC to achieve at an end of the charge of the battery and determining the amount of cooling to apply during the charge of the battery to achieve the target SOC. The method can include the one or more processors determining a time during the charge of the battery at which to apply the amount of cooling to minimize a duration of the charge of the battery. The method can include the one or more processors providing to the battery the amount of cooling determined by the model during the charge to achieve the target SOC at the end of the charge of the battery.

The method can include the one or more processors determining the amount of cooling based at least on an amount of flow of a coolant to apply during the charge determining a time at which to provide the amount of cooling during the charge of the battery and providing to the battery the amount of flow of the coolant determined by the model at the determined time, during the charge of the battery. The method can include the one or more processors determining the amount of cooling based at least on a temperature of the coolant to apply during the charge, and causing a cooler to provide to the battery, during the charge of the battery the coolant at the temperature of the coolant determined by the model.

The method can include the one or more processors determining, using the model, a time to provide the amount of cooling to the battery, and causing the cooler to provide to the battery the amount of coolant at the time determined using the model. The method can include the one or more processors receiving from a battery management system a setpoint for cooling a cell of the at least two cells, and determining, the amount of cooling based at least on the setpoint.

The at least two cells of the battery can comprise a first cell of a plurality of cells of the battery having a first temperature that is lower than each temperature of each other cell of the plurality of cells. The at least two cells of the battery can comprise a second cell of the plurality of cells having a second temperature that is higher than each temperature of the each other cell of the plurality of cells of the battery. The method can include the one or more processors determining an amount of current at which to charge the battery based at least on the amount of cooling and setting the current at which to charge the battery according to the determined amount.

A non-transitory computer-readable media having processor readable instructions, such that, when executed, cause at least one processor to identify a state of charge (SOC) of a battery of an electric vehicle, a temperature threshold for a temperature of the battery and a gradient threshold for a difference in temperature between at least two cells of the battery. The non-transitory computer-readable media can include the instructions such that, when executed, cause the at least one processor to determine an amount of cooling to apply during a charge of the battery based at least on the SOC, the temperature of the battery and the difference in temperature input into a model for cooling the battery to maintain the temperature below the temperature threshold and the difference in temperature below the gradient threshold. The non-transitory computer-readable media can include the instructions such that, when executed, cause the at least one processor to provide to the battery the amount of cooling determined by the model to maintain the temperature below the temperature threshold and the difference in temperature below the gradient threshold during the charge.

The non-transitory computer-readable media can include the instructions such that, when executed, cause the at least one processor to identify a target SOC to achieve and determine the amount of cooling to apply during the charge to achieve the target SOC. The non-transitory computer-readable media can include the instructions such that, when executed, cause the at least one processor to provide to the battery the amount of cooling determined by the model during the charge to achieve the target SOC.

The non-transitory computer-readable media can include the instructions such that, when executed, cause the at least one processor to determine the amount of cooling based at least on an amount of flow of a coolant to apply during the charge. The non-transitory computer-readable media can include the instructions such that, when executed, cause the at least one processor to provide to the battery the amount of flow of the coolant determined by the model during the charge of the battery.

The non-transitory computer-readable media can include the instructions such that, when executed, cause the at least one processor to determine the amount of cooling based at least on a temperature of the coolant to apply during the charge. The non-transitory computer-readable media can include the instructions such that, when executed, cause the at least one processor to cause a cooler to provide to the battery the coolant at the temperature of the coolant determined by the model during the charge of the battery.

These and other aspects and implementations are discussed in detail below. The foregoing information and the following detailed description include illustrative examples of various aspects and implementations and provide an overview or framework for understanding the nature and character of the claimed aspects and implementations. The drawings provide illustration and a further understanding of the various aspects and implementations and are incorporated in and constitute a part of this specification. The foregoing information and the following detailed description and drawings include illustrative examples and should not be considered as limiting.

BRIEF DESCRIPTION OF THE DRAWINGS

The accompanying drawings are not intended to be drawn to scale. Like reference numbers and designations in the various drawings indicate like elements. For purposes of clarity, not every component may be labeled in every drawing. In the drawings.

DETAILED DESCRIPTION

Following below are more detailed descriptions of various concepts related to, and implementations of, methods, apparatuses, and systems of cooling (or otherwise regulating the temperature) of electric vehicle batteries. The various concepts introduced above and discussed in greater detail below may be implemented in any of numerous ways.

When charging the battery of an electric vehicle (EV) at a charging station (CS), the amount of charging current provided by the CS can control the duration of the EV battery charge. For example, charging an EV battery at a higher current level can reduce the charge time, while charging the battery at a lower current level can prolong the charge duration, adversely affecting the user experience. However, while increasing the charge current can reduce the charge time it can also increase the amount of heat generated in the battery. This can lead to the battery temperature exceeding the derate temperature threshold levels (e.g., the maximum temperature derate threshold or the gradient temperature derate threshold) beyond which battery life can be adversely affected, unless the current level is reduced. As a result, it is challenging to shorten or minimize the duration of the EV charge time by increasing the EV charge current levels without exceeding the derate temperature thresholds.

The technical solutions of this disclosure overcome these challenges with an EV battery cooling model that determines the amount of cooling for improving charging at a given an EV battery to maximize maximizes EV charge current while maintaining optimizing cooling during charging to keep both overall battery temperature and gradient temperature levels below their derate thresholds throughout the charge. In doing so, the technical solutions minimize or reduce the charge time of the EV by allowing the EV battery to charge at a maximum charging current without exceeding the derate thresholds or adversely affecting the battery longevity.

Figure 1:
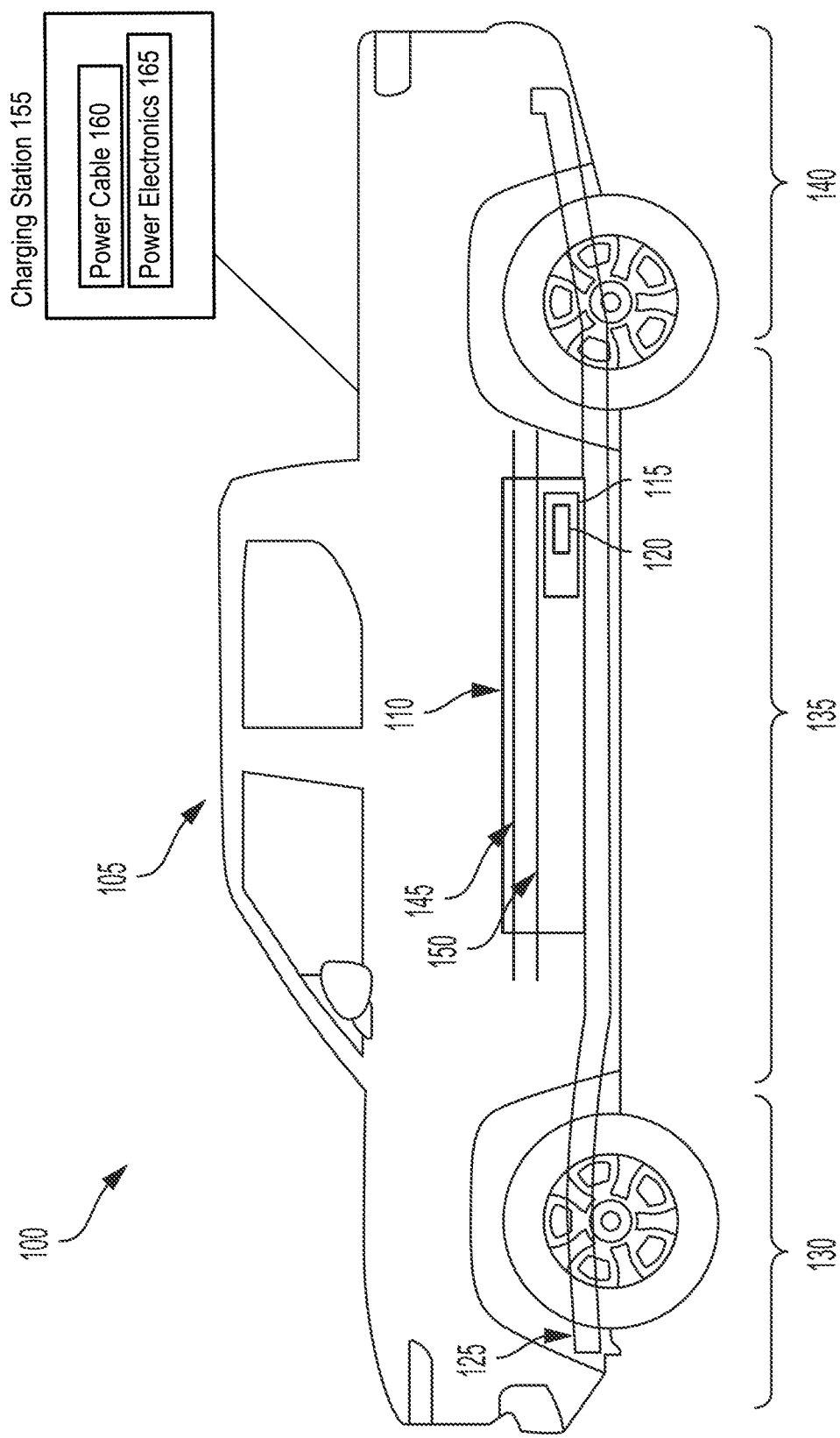
FIG. 1 depicts an example electric vehicle connected to a charging station.

FIG. 1 depicts an example cross-sectional view 100 of an electric vehicle 105 installed with at least one battery pack 110. Electric vehicles 105 can include electric trucks, electric sport utility vehicles (SUVs), electric delivery vans, electric automobiles, electric cars, electric motorcycles, electric scooters, electric passenger vehicles, electric passenger or commercial trucks, hybrid vehicles, or other vehicles such as sea or air transport vehicles, planes, helicopters, submarines, boats, or drones, among other possibilities. Yet, it should also be noted that battery pack 110 may also be used as an energy storage system to power a building, such as a residential home or commercial building. Electric vehicles 105 can be fully electric or partially electric (e.g., plug-in hybrid) and further, electric vehicles 105 can be fully autonomous, partially autonomous, or unmanned. Electric vehicles 105 can also be human operated or non-autonomous. Electric vehicles 105 such as electric trucks or automobiles can include on-board battery packs 110, battery modules 115, or battery cells 120 to power the electric vehicles. The electric vehicle 105 can include a chassis 125 (e.g., a frame, internal frame, or support structure). The chassis 125 can support various components of the electric vehicle 105. The chassis 125 can span a front portion 130 (e.g., a hood or bonnet portion), a body portion 135, and a rear portion 140 (e.g., a trunk, payload, or boot portion) of the electric vehicle 105. The battery pack 110 can be installed or placed within the electric vehicle 105. For example, the battery pack 110 can be installed on the chassis 125 of the electric vehicle 105 within one or more of the front portion 130, the body portion 135, or the rear portion 140. The battery pack 110 can include or connect with at least one busbar, e.g., a current collector element. For example, the first busbar 145 and the second busbar 150 can include electrically conductive material to connect or otherwise electrically couple the battery modules 115 or the battery cells 120 with other electrical components of the electric vehicle 105 to provide electrical power to various systems or components of the electric vehicle 105.

EV 105 can be electrically coupled to a charging station (CS) 155 via a power cable 160. CS 155 can include any combination of hardware and software for charging EV battery 110 of an EV 105. CS 155 can include various power electronics 165 (e.g., rectifiers, inverters, voltage, current or power regulators, power or voltage converters, charging controllers and other electronics) that can be used for managing and supplying power to the EV 105 during the charging process. CS 155 can be configured to provide a variety of power levels or configurations. For example, a CS 155 can include level 2 charging station that provide 240 volts AC at around 7.2 kW via a power cable 160 to establish a physical connection with the EV 105. CS 155 can include a wireless charging CS 155 (e.g., inductive charging EV charger or a resonant inductive coupling EV charger) that may not utilize a power cable 160 to couple power to the battery of the EV 105.

Figure 2A:
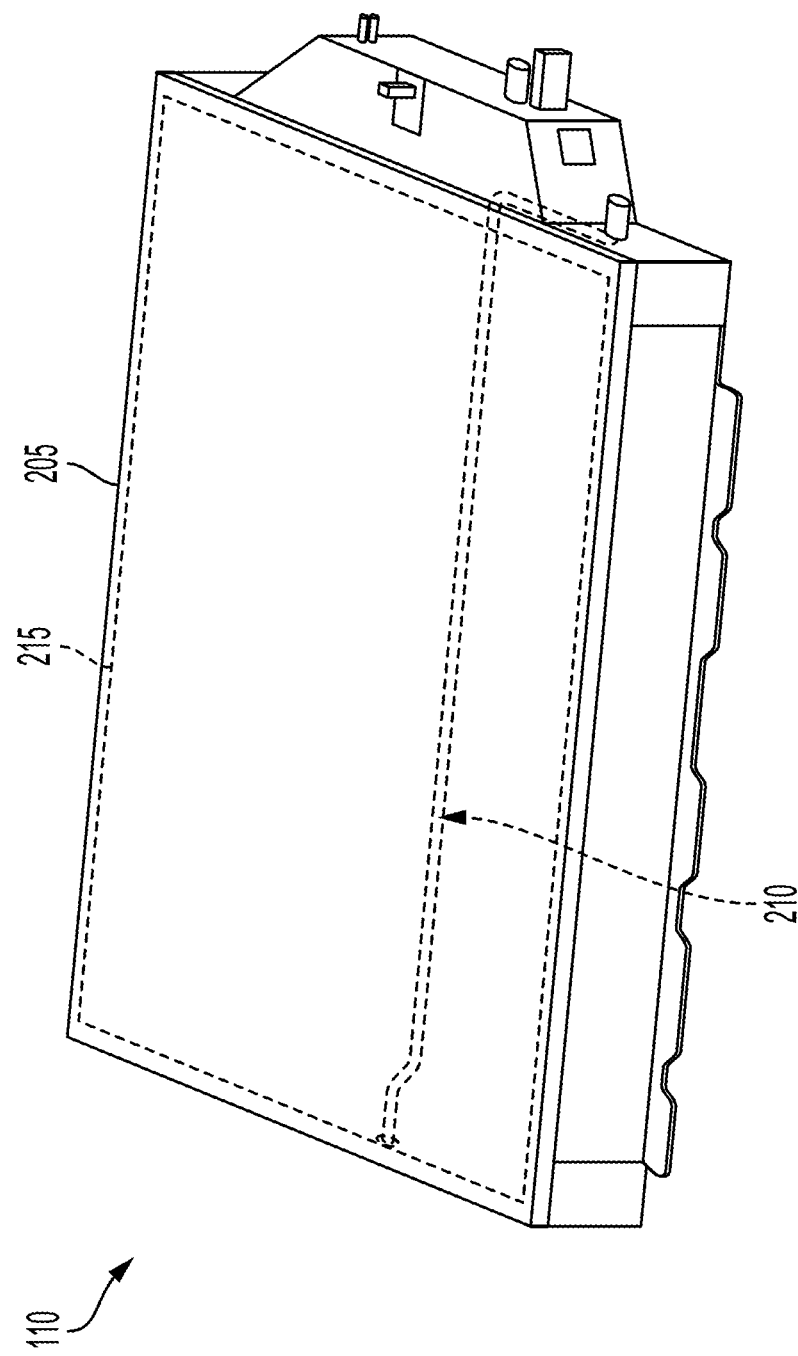
FIG. 2A depicts an example of one or more battery packs.

FIG. 2A depicts an example battery pack 110. Referring to FIG. 2A, among others, the battery pack 110 can provide power to electric vehicle 105. Battery packs 110 can include any arrangement or network of electrical, electronic, mechanical or electromechanical devices to power a vehicle of any type, such as the electric vehicle 105. The battery pack 110 can include at least one housing 205. The housing 205 can include at least one battery module 115 or at least one battery cell 120, as well as other battery pack components. The housing 205 can include a shield on the bottom or underneath the battery module 115 to protect the battery module 115 from external conditions, particularly if the electric vehicle 105 is driven over rough terrains (e.g., off-road, trenches, rocks, etc.) The battery pack 110 can include at least one cooling line that can distribute fluid through the battery pack 110 as part of a thermal/temperature control or heat exchange system that can also include at least one thermal component (e.g., cold plate) 215. In some instances, the thermal component 215 may be positioned in relation to a top submodule and a bottom submodule, such as in between the top and bottom submodules, among other possibilities. The battery pack 110 can include any number of thermal components 215. For example, there can be one or more thermal components per battery pack 110, or per battery module 115. The fluid (e.g., cooling) line 210 can be coupled with, part of, or independent from the thermal component 215.

Figure 2B:
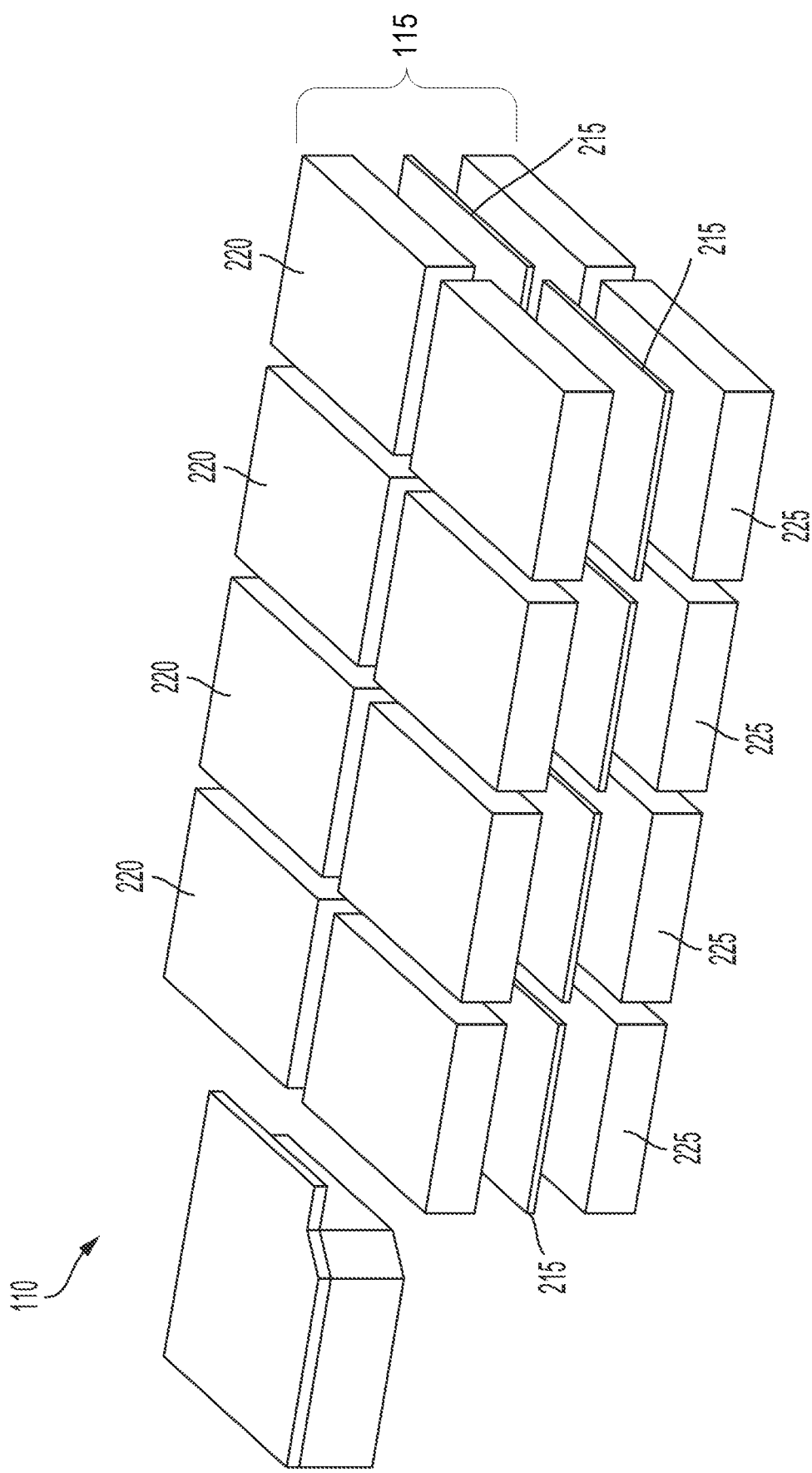
FIG. 2B depicts an example of one or more battery modules.
Figure 2C:
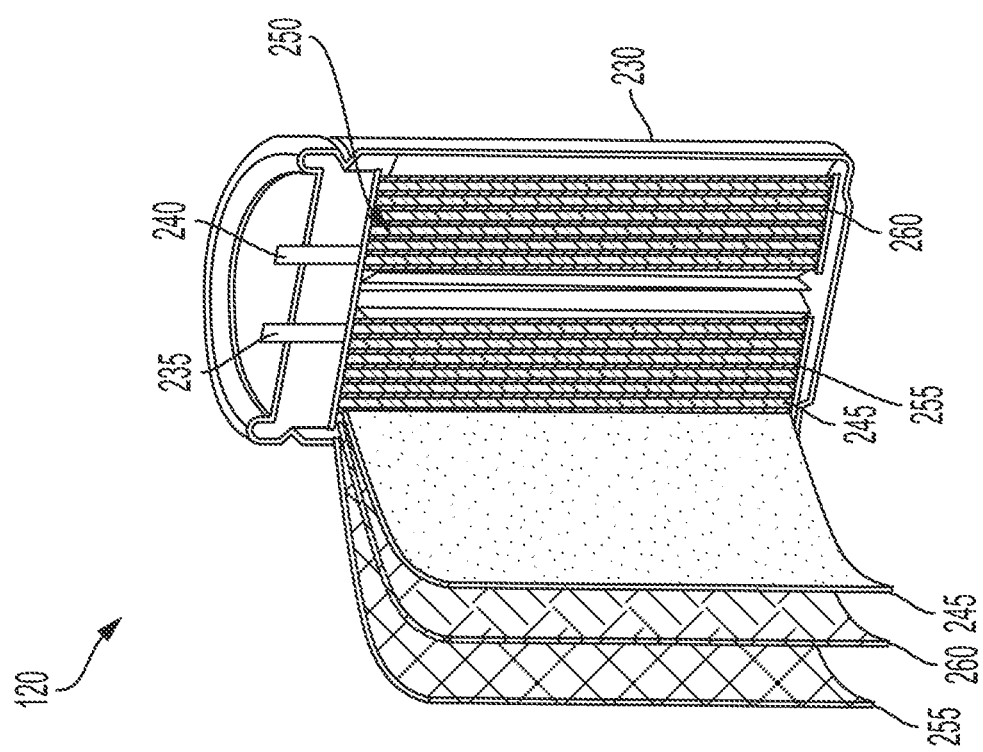
FIG. 2C depicts a cross sectional view of an example of a battery cell.

FIG. 2B depicts example battery modules 115, and FIG. 2C depicts an example cross sectional view of a battery cell 120. The battery modules 115 can include at least one submodule. For example, the battery modules 115 can include at least one top submodule 220 or at least one bottom submodule 225. At least one thermal component 215 can be disposed between the top submodule 220 and the bottom submodule 225. For example, one thermal component 215 can be configured for heat exchange with one battery module 115. The thermal component 215 can be disposed or thermally coupled between the top submodule 220 and the bottom submodule 225. One thermal component 215 can also be thermally coupled with more than one battery module 115 (or more than two submodules 220, 225). The battery submodules 220, 225 can collectively form one battery module 115. In some examples each submodule 220, 225 can be considered as a complete battery module 115, rather than a submodule.

The battery modules 115 can each include a plurality of battery cells 120. The battery modules 115 can be disposed within the housing 205 of the battery pack 110. The battery modules 115 can include battery cells 120 that are cylindrical, prismatic, or pouch cells, for example. The battery module 115 can operate as a modular unit of battery cells 120. For example, a battery module 115 can collect current or electrical power from the battery cells 120 that are included in the battery module 115 and can provide the current or electrical power as output from the battery pack 110. The battery pack 110 can include any number of battery modules 115. For example, the battery pack can have one, two, three, four, five, six, seven, eight, nine, ten, eleven, twelve or other number of battery modules 115 disposed in the housing 205. It should also be noted that each battery module 115 may include a top submodule 220 and a bottom submodule 225, possibly with a cold plate 215 in between the top submodule 220 and the bottom submodule 225. The battery pack 110 can include or define a plurality of areas for positioning of the battery module 115. The battery modules 115 can be square, rectangular, circular, triangular, symmetrical, or asymmetrical. In some examples, battery modules 115 may be different shapes, such that some battery modules 115 are rectangular but other battery modules 115 are square shaped, among other possibilities. The battery module 115 can include or define a plurality of slots, holders, or containers for a plurality of battery cells 120.

Battery cells 120 have a variety of form factors, shapes, or sizes. For example, battery cells 120 can have a cylindrical, rectangular, square, cubic, flat, pouch, or prismatic form factor. Battery cells 120 can be assembled, for example, by inserting a winded or stacked electrode roll (e.g., a jelly roll) including electrolyte material into at least one battery cell housing 230. The electrolyte material, e.g., an ionically conductive fluid or other material, can generate or provide electric power for the battery cell 120. A first portion of the electrolyte material can have a first polarity, and a second portion of the electrolyte material can have a second polarity. The housing 230 can be of various shapes, including cylindrical or rectangular, for example. Electrical connections can be made between the electrolyte material and components of the battery cell 120. For example, electrical connections with at least some of the electrolyte material can be formed at two points or areas of the battery cell 120, for example to form a first polarity terminal 235 (e.g., a positive or anode terminal) and a second polarity terminal 240 (e.g., a negative or cathode terminal). The polarity terminals can be made from electrically conductive materials to carry electrical current from the battery cell 120 to an electrical load, such as a component or system of the electric vehicle 105.

The battery cell 120 can include a lithium-ion battery cell, for example. In lithium-ion battery cells, lithium ions can transfer between a positive electrode and a negative electrode during charging and discharging of the battery cell. For example, the battery cell anode can include lithium or graphite, and the battery cell cathode can include a lithium-based oxide material. The electrolyte material can be disposed in the battery cell 120 to separate the anode and cathode from each other and to facilitate transfer of lithium ions between the anode and cathode. It should be noted that battery cell 120 can also take the form of a solid state battery cell developed using solid electrodes and solid electrolytes. Yet further, some battery cells 120 can be solid state battery cells and other battery cells 120 can include liquid electrolytes for lithium-ion battery cells.

The battery cell 120 can be included in battery modules 115 or battery packs 110 to power components of the electric vehicle 105. The battery cell housing 230 can be disposed in the battery module 115, the battery pack 110, or a battery array installed in the electric vehicle 105. The housing 230 can be of any shape, such as cylindrical with a circular (e.g., as depicted), elliptical, or ovular base, among others. The shape of the housing 230 can also be prismatic with a polygonal base, such as a triangle, a square, a rectangle, a pentagon, and a hexagon, among others.

The housing 230 of the battery cell 120 can include one or more materials with various electrical conductivity or thermal conductivity, or a combination thereof. The electrically conductive and thermally conductive material for the housing 230 of the battery cell 120 can include a metallic material, such as aluminum, an aluminum alloy with copper, silicon, tin, magnesium, manganese, or zinc (e.g., aluminum 1000, 4000, or 5000 series), iron, an iron-carbon alloy (e.g., steel), silver, nickel, copper, and a copper alloy, among others. The electrically insulative and thermally conductive material for the housing 230 of the battery cell 120 can include a ceramic material (e.g., silicon nitride, silicon carbide, titanium carbide, zirconium dioxide, beryllium oxide, and among others) and a thermoplastic material (e.g., polyethylene, polypropylene, polystyrene, polyvinyl chloride, or nylon), among others.

The battery cell 120 can include at least one anode layer 245, which can be disposed within the cavity 250 defined by the housing 230. The anode layer 245 can receive electrical current into the battery cell 120 and output electrons during the operation of the battery cell 120 (e.g., charging or discharging of the battery cell 120). The anode layer 245 can include an active substance. The active substance can include, for example, an activated carbon or a material infused with conductive materials (e.g., artificial or natural Graphite, or blended), lithium titanate ($Li_4Ti_5O_{12}$), or a silicon-based material (e.g., silicon metal, oxide, carbide, pre-lithiated).

The battery cell 120 can include at least one cathode layer 255 (e.g., a composite cathode layer compound cathode layer, a compound cathode, a composite cathode, or a cathode). The cathode layer 255 can be disposed within the cavity 250. The cathode layer 255 can output electrical current out from the battery cell 120 and can receive electrons during the discharging of the battery cell 120. The cathode layer 255 can also release lithium ions during the discharging of the battery cell 120. Conversely, the cathode layer 255 can receive electrical current into the battery cell 120 and can output electrons during the charging of the battery cell 120. The cathode layer 255 can receive lithium ions during the charging of the battery cell 120.

The battery cell 120 can include an electrolyte layer 260 disposed within the cavity 250. The electrolyte layer 260 can be arranged between the anode layer 245 and the cathode layer 255 to separate the anode layer 245 and the cathode layer 255. The electrolyte layer 260 can transfer ions between the anode layer 245 and the cathode layer 255. The electrolyte layer 260 can transfer cations from the anode layer 245 to the cathode layer 255 during the operation of the battery cell 120. The electrolyte layer 260 can transfer anions (e.g., lithium ions) from the cathode layer 255 to the anode layer 245 during the operation of the battery cell 120.

The electrolyte layer 260 can include or be made of a liquid electrolyte material. The liquid electrolyte material can include a lithium salt dissolved in a solvent. The lithium salt for the liquid electrolyte material for the electrolyte layer 260 can include, for example, lithium tetrafluoroborate (LiBF$_4$), lithium hexafluorophosphate (LiPF$_6$), and lithium perchlorate (LiClO$_4$), among others. The solvent can include, for example, dimethyl carbonate (DMC), ethylene carbonate (EC), and diethyl carbonate (DEC), among others. The electrolyte layer 260 can include or be made of a solid electrolyte material, such as a ceramic electrolyte material, polymer electrolyte material, or a glassy electrolyte material, or among others, or any combination thereof. The ceramic electrolyte material for the electrolyte layer 260 can include, for example, lithium phosphorous oxy-nitride (Li$_x$PO$_y$N$_z$), lithium germanium phosphate sulfur (Li$_{10}$GeP$_2$S$_{12}$), Yttria-stabilized Zirconia (YSZ), NASICON (Na$_3$Zr$_2$Si$_2$PO$_{12}$), beta-alumina solid electrolyte (BASE), perovskite ceramics (e.g., strontium titanate (SrTiO$_3$)), among others. The polymer electrolyte material (e.g., a hybrid or pseudo-solid state electrolyte) for electrolyte layer 260 can include, for example, polyacrylonitrile (PAN), polyethylene oxide (PEO), polymethyl-methacrylate (PMMA), and polyvinylidene fluoride (PVDF), among others. The glassy electrolyte material for the electrolyte layer 260 can include, for example, lithium sulfide-phosphor pentasulfide (Li$_2$S—P$_2$S$_5$), lithium sulfide-boron sulfide (Li$_2$S—B$_2$S$_3$), and Tin sulfide-phosphor pentasulfide (SnS—P$_2$S$_5$), among others.

Figure 3:
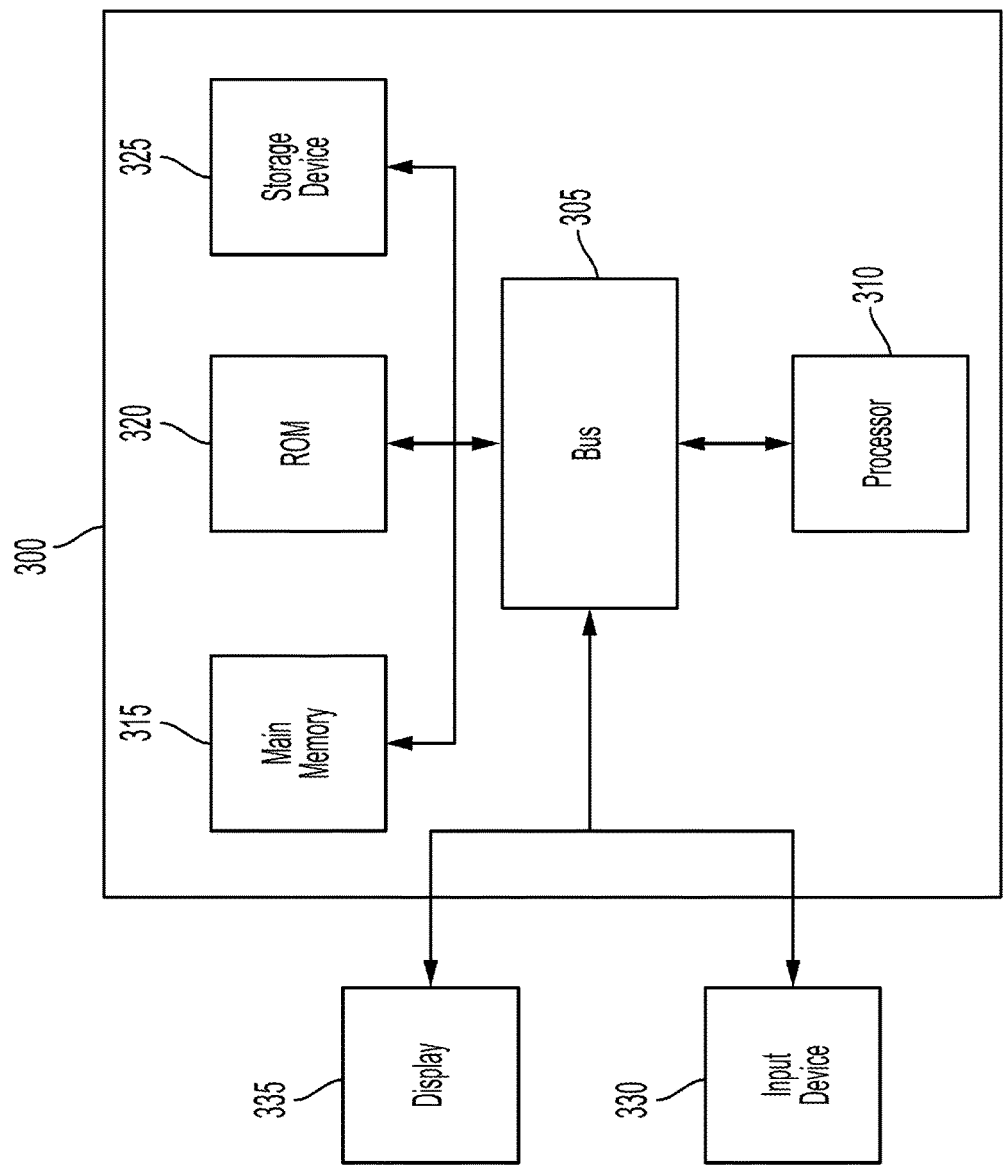
FIG. 3 is a block diagram illustrating an example architecture for a computer system that can be employed to implement elements of the systems and methods described and illustrated herein.

FIG. 3 depicts an example block diagram of an example computer system 300. The computer system or computing device 300 can include, included by, or be used to implement a data processing system 402, a CS 155, or any of their components. The computing system 300 includes at least one bus 305 or other communication component for communicating information and at least one processor 310 or processing circuit coupled to the bus 305 for processing information. The computing system 300 can also include one or more processors 310 or processing circuits coupled to the bus for processing information. The computing system 300 also includes at least one main memory 315, such as a random access memory (RAM) or other dynamic storage device, coupled to the bus 305 for storing information, and instructions to be executed by the processor 310. The main memory 315 can be used for storing information during execution of instructions by the processor 310. The computing system 300 may further include at least one read only memory (ROM) 320 or other static storage device coupled to the bus 305 for storing static information and instructions for the processor 310. A storage device 325, such as a solid state device, magnetic disk or optical disk, can be coupled to the bus 305 to persistently store information and instructions.

The computing system 300 may be coupled via the bus 305 to a display 335, such as a liquid crystal display, or active matrix display, for displaying information to a user such as a driver of the electric vehicle 105 or other end user. An input device 330, such as a keyboard or voice interface may be coupled to the bus 305 for communicating information and commands to the processor 310. The input device 330 can include a touch screen display 335. The input device 330 can also include a cursor control, such as a mouse, a trackball, or cursor direction keys, for communicating direction information and command selections to the processor 310 and for controlling cursor movement on the display 335.

The processes, systems and methods described herein can be implemented by the computing system 300 in response to the processor 310 executing an arrangement of instructions contained in main memory 315. Such instructions can be read into main memory 315 from another computer-readable medium, such as the storage device 325. Execution of the arrangement of instructions contained in main memory 315 causes the computing system 300 to perform the illustrative processes described herein. One or more processors in a multi-processing arrangement may also be employed to execute the instructions contained in main memory 315. Hard-wired circuitry can be used in place of or in combination with software instructions together with the systems and methods described herein. Systems and methods described herein are not limited to any specific combination of hardware circuitry and software.

Although an example computing system has been described in FIG. 3, the subject matter including the operations described in this specification can be implemented in other types of digital electronic circuitry, or in computer software, firmware, or hardware, including the structures disclosed in this specification and their structural equivalents, or in combinations of one or more of them.

Figure 4:
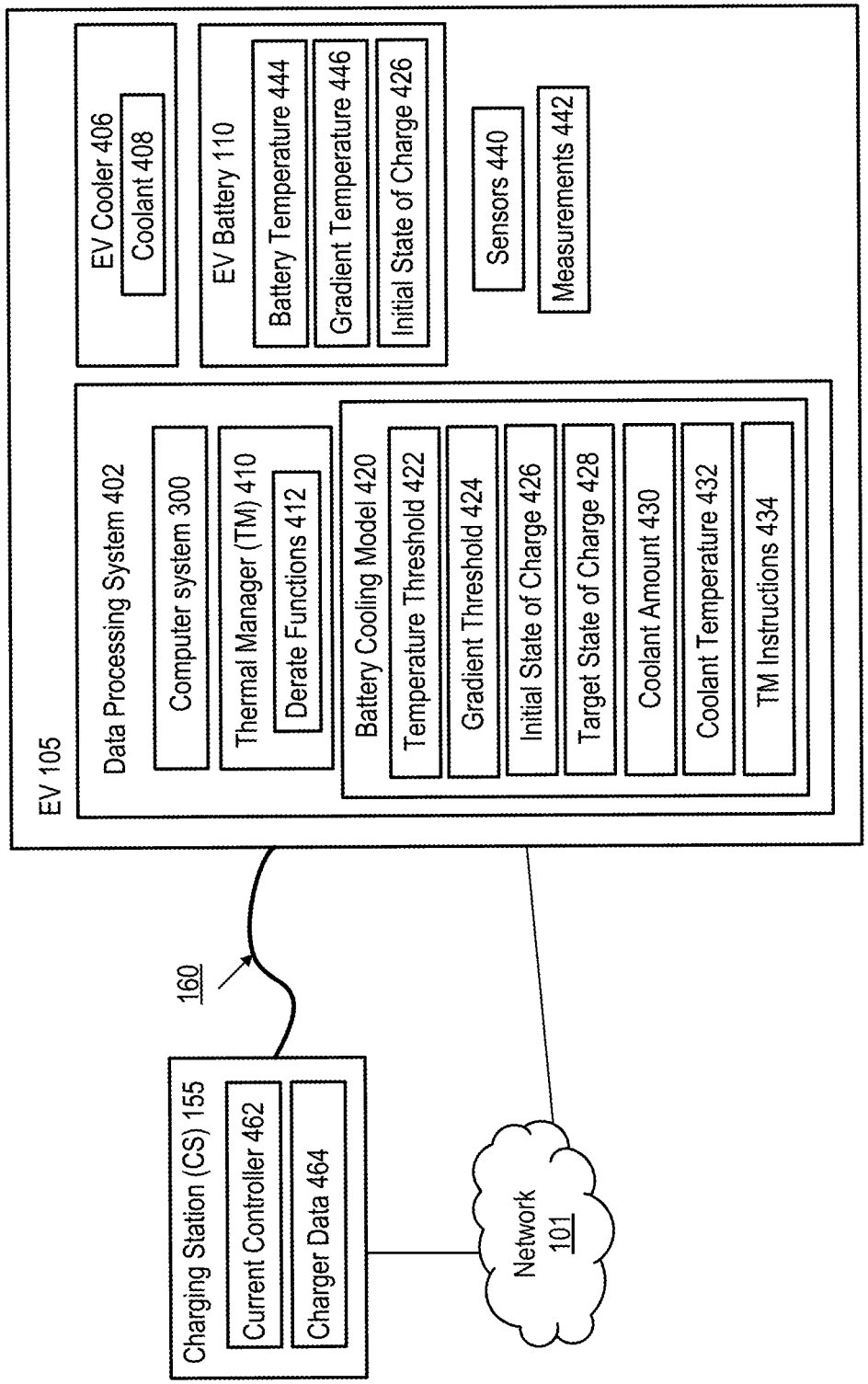
FIG. 4 illustrates an example system of the technical solutions for model-based cooling of an EV battery to facilitate a DCFC of the battery at an improved charge current.

FIG. 4 illustrates an example system 400 of the present solution for model based cooling of an EV battery to facilitate a DCFC of the battery 110 at an improved charge current. FIG. 4 can include an EV 105 that can include one or more EV coolers 406 using one or more coolants 408 to dissipate the heat from an EV battery 110. EV battery 110 can have a battery temperature 444 and a battery gradient temperature 446 (e.g., a temperature difference between different cells 120 of the battery 110). EV 105 can include one or more sensors 440 for taking various types of measurements 442, such as, temperature, current, power, or a state of charge (SOC) of the battery 110. EV 105 can include one or more data processing systems (DPS) 402 which can include or utilize one or more computer systems 300 to implement various functionalities. DPS 402 can include or implement one or more battery cooling models 420 and thermal managers (TM) 410 having one or more derate functions 412. A battery cooling model 420 can include one or more temperature thresholds 422, gradient thresholds 424, initial state of charge (SOC) 426, target SOC 428, coolant amount 430, coolant temperature 432 and thermal management (TM) instructions 434. Across a network 101, a charging station CS 155 can include one or more current controllers 462 and charger data 464, such as data on the level of current to apply during the DCFC for a given EV 105. CS 155 can be in network communication with DPS 402 or EV 105 and can be electrically coupled with the EV 105 via a power cable 160 (e.g., the EV battery charger cable) to provide the charge current during the DCFC charging.

In an implementation, a system 400 can include an EV 105 coupled with a CS 155 for a direct current fast charging of the EV battery 110. As EV battery temperature 444 and EV gradient temperature 446 can increase during a DCFC charging, DPS 402 can utilize measurements 442 from sensors 440 to keep track of the battery temperature 444 with respect to the temperature thresholds 422 and of the gradient temperature 446 with respect to the gradient thresholds 424 of the EV battery 110. DPS 402 can use an EV cooler 406 to cool the EV battery 110 with a coolant 408, using the initial SOC 426 and the target SOC 428 to determine the coolant amount 430 and coolant temperature 432 to apply to maintain the battery temperature 444 below the temperature threshold 422 and the gradient temperature 446 below the gradient threshold 424. Battery cooling model 420 can determine the amount of cooling to provide to the battery during the battery charge by determining the coolant amount 430 and the coolant temperature 432 to apply, as well as the timing at which to apply the cooling. Battery cooling model 420 can issue TM instructions 434 to the thermal manager 410 to apply derate functions 412, as desired, such as if the battery temperature 444 or the gradient temperature 446 exceed their respective thresholds (e.g., 422 and 424). Battery cooling model 420 can utilize the measurements and the state of the battery 110 (e.g., initial SOC 426, target SOC 428, the battery temperature 444 and the gradient temperature 446 in view of the respective temperature thresholds 422 and the gradient thresholds 424) to determine the coolant amount 430 or the coolant temperature 432 to be applied. DPS 402 can coordinate with the CS 155 to use the current controller 462 and charger data 464 (e.g., measurements from sensors 440 of the EV 105) to provide the DCFC at the highest charge current, without exceeding the temperature threshold 422 or gradient threshold 424 to adversely affect the EV battery 110 longevity or operation.

Data processing system (DPS) 402 can include any combination of hardware and software for processing information or data for battery cooling. DPS 402 can include the functionality (e.g., computer code, instructions, data, circuitry, functions or functionalities) to provide a model based cooling of an EV battery for an efficient DCFC of the battery 110 at an increased or maximized charge current for the given battery temperature 444 or the gradient temperature 446. DPS 402 can comprise the functionality for managing cooling operations a battery 110 (e.g., any combination of one or more battery packs, modules or cells). DPS 402 can perform any functionality for controlling cooling of EV battery using derate functions 412 or an amount of cooling that can be determined by the battery cooling model 420, such as based on the coolant temperature 432 and the coolant amount 430 (e.g., amount of cooling fluid to be provided to the battery over a period of time).

Data processing system 402 can be implemented and operate on an EV 105, a CS 155 or include any of its functionality operating or executing on a remote server, a server farm, a virtual machine or a cloud computing system comprising one or more servers or located at a data center. DPS 402 can include or be coupled to a computer system 300, which can include one or more processors 310 that can be coupled with memory (e.g., 315, 320, 325), each of which can store computer code, scripts, functions and instructions to implement any functionality of the DPS 402 or the CS 155 to provide the DCFC to the EV 105. DPS 402 can include scripts, functions and computer code stored in memory and executed or operating on one or more processors 310 performing processing related to battery cooling using the battery cooling model 420. For example, DPS 402 can have access to or include one or more derate functions 412 and TM instructions 434.

DPS 402 can communicate with the EV 105 or CS 155 via a network 101. Network 101 can include any interconnected system of devices or computers allowing communication interfaces or components of EV 105, DPS 402, and CS 155, to seamlessly communicate and exchange data, such as measurements 442, TM instructions 434, battery temperatures 444, gradient temperatures 446 and any other information. Network 101 can include any type and form of network, such as wired or wireless networks. Wired networks can include Ethernet or fiber-optic networks and can use or include physical cables to transmit data at high speeds in fixed installations. Network 101 can include wireless networks, which can utilize wireless, for example radio signals, for data transmission. Network 101 can include various types, such as Wi-Fi, Bluetooth, cellular networks (e.g., 4G, 5G or 6G networks), satellite networks. Network 101 can include technologies for flexible and mobile data exchange, to facilitate data transmissions between EV 105 or remote servers (e.g., in the implementations in which at least a portion of the DPS 402 is on a remote server). Network 101 can facilitate data transmission across a diverse range of devices and locations, such as via wireless local area networks (WLANs) or Internet.

EV cooler 406 can include any combination of hardware and software for cooling an EV battery 110. EV cooler 406 can include an coolant that includes any gas, liquid, and any combination of gasses or liquids. EV cooler 406 can be configured to provide cooling either to the EV's cabin or its battery 110, such as when subjected to heating during DCFC (DC Fast Charging) sessions. EV cooler 406 can facilitate management or control, such as lowering or maintaining, of temperature levels within an acceptable or a desirable temperature range (e.g., minimum and maximum temperature thresholds).

EV cooler 406 can include any type of a cooling device using any type of a coolant 408. Coolant 408 can include any fluid (e.g., gas or a liquid) that can be used for cooling, chilling or otherwise reducing a temperature of the battery or any of its components (e.g., battery packs 110, battery modules 115 or battery cells 120). EV cooler 406 can include, for example, a vehicular air-conditioning unit that can use a coolant 408 that includes a chilled air that can be circulated via a forced convection airflow system to provide the temperature regulation, such as a vehicle air conditioning unit. EV cooler 406 can include a liquid cooler, which circulate a liquid coolant through at least a portion of a system. EV cooler 406 can include a combination of a plurality of cooling units, which can include a variety of cooling fluids, such as chilled air, water, or any other coolants suitable for EV cooling systems, including ethylene glycol and propylene glycol.

EV cooler 406 can include any thermal management system for cooling any portion of an EV 105, such as a battery 110. Cooler 406 can include any one or more devices or systems for dissipating thermal energy, such as electrical cooling systems, air cooling systems or water cooling systems. For instance, a cooler 406 can include a water cooling loop or loops that can flow through a path to take the heat from EV battery 110 and deliver the heat to a heat exchanger unit that takes the heat away from the water and sends the cooled water back into the loop to continue looping and removing thermal energy. Cooler 408 can include any combination of lines or pipes for conducting or flowing liquid coolant, one or more fluid pumps, heat exchangers, cold plates, air or water fans, heat sinks, active and passive cooling systems and structures, heat pipes, Peltier systems, radiators, natural or forced convection cooling devices, refrigerators or any other components that can be used for cooling.

A charging station 155 can include any combination of hardware and software for providing electricity or otherwise electrically charging one or more batteries of an EVs 105. CS 155 can include a directional or a bidirectional charging station, including for example, any combination of hardware and software for providing and drawing power or energy (e.g., charging and discharging) one or more batteries of the EV 105, including any combination of one or more battery packs 110, battery modules 115 or battery cells 120. CS 155 can include scripts, functions and computer code stored in memory and executed or operating on one or more processors to implement a functionality of the CS 155. For example, CS 155 can include a computer system 300, including one or more processors 310 and memories 315, 320 and 325, each of which can store computer code, scripts, functions and instructions to implement any functionality of CS 155, including controlling the amount of current, voltage or power supplied to EV 105. CS 155 can include electrical and power circuitry, control logic or circuits, power electronics, power supply circuitry, energy storage devices, such as batteries, and other hardware for storing, controlling, modulating or otherwise managing power, energy or electricity provided to, or drawn from, EVs 105. CS 155 can include electric vehicle charging equipment that can include a power and control box and power cord or a cable. CS 155 can include circuitry for converting alternating current (AC) to direct current (DC), such as an AC-DC converter. CS 155 can include DC-AC converters or DC-DC converters.

Charging station 155 can include one or more bidirectional chargers which can be electrically coupled to an electrical grid. The CS 155 can draw electricity from the grid to charge EVs 105, and conversely, receive electricity from the batteries (e.g., 110, 115 or 120) to provide it to the electrical grid. Charging station 155 can include or configure any level of EV charging equipment, such as level-1, level-2, level-3 to provide or draw electricity, at any voltage, current or power level. For example, CS 155 can operate at any voltage level, such as 120V, 208-240V or 400-900V. Similarly, CS 155 can operate at any power levels, such as 5 kW, 10 kW, 20 KW, 30 KW, 50 KW, 80 KW, 100 KW, 150 KW, 220 KW, 250 KW, 300 KW, 350 kW, 500 kW, or more than 500 kW. Higher power throughput by CS 155 can result in increased thermal energy and temperature at the battery (e.g., 110, 115 or 120) or within the CS 155. As the temperature of such components increase, the CS 155 can decrease the power output or charge rate to or from the EV 105 to maintain the temperature of the component at or below an established thermal threshold. Charging station 155 can utilize coolers 406 to cool down components of the CS 155 and maintain the power, voltage or current throughput at a higher level while satisfying the thermal threshold.

Current controller 462 of the charging station 155 can include any combination of hardware and software for controlling the amount of current facilitated to the vehicle, including current provided to the EV battery 110 or received from the EV battery 110. Current controller 462 can include circuitry, computer code or functions for utilizing various charger data 464 to implement or control the charging current. Charger data 464 can include any information on the EV 105, including for example, battery temperature 444, gradient temperature 446 or any other measurements 442 from the sensors 440 at the EV 105. Charger data 464 can include information or readings on coolant amount 430, coolant temperature 432, TM instructions 434, initial state of charge 426 or target state of charge 428.

Thermal manager 410 can include any combination of hardware and software for managing or controlling heat at the EV battery 110. Thermal manager 410 can include any functionality for controlling or activating EV cooler 406 and using battery cooling model 420 to determine the amount of coolant and timing of the coolant provided to the EV battery 110. Thermal manager 410 can include and apply derate functions 412 for maintaining temperature levels (e.g., battery temperature 444 and gradient temperature 446) below respective thermal thresholds (e.g., temperature threshold 422 or gradient threshold 424). Derate functions can include instructions, circuits or computer code for reducing operational capacity or performance of a battery charging (e.g., reducing charge current) in order to maintain a temperature of the battery below the given thresholds. Thermal manager 410 can include the functionality to utilize battery cooling model 420 to determine the amount of cooling (e.g., any combination of the coolant amount 430 or coolant temperature 432) to be provided to the EV battery 110 (e.g., packs, modules or cells of the battery).

TM instructions 434 can include any commands or instructions for a thermal manager 410. TM instructions 434 can include instructions to activate an EV cooler 406 and provide a coolant 408 of a set coolant amount 432 or at a coolant temperature 432, at a particular time, time period or a time duration. TM instructions 434 can include instructions to increase or decrease the flow of coolant 408 (e.g., adjust coolant amount 430) to address a gradient temperature 446 or battery temperature 444 (e.g., maximum battery temperature). TM instructions 434 can include commands for timing of the cooling to be provided to the EV battery during the duration of the EV battery charge, such as for example, identifying a minute and second of the EV charge event at which to trigger a particular amount of cooling (e.g., provide a particular coolant amount 430 at a particular coolant temperature 432). TM instructions 434 can include instructions to manage the rate of coolant 408 to be provided over a period of time (e.g., flow of gas per second or minute). TM instructions 434 can include the coolant temperature 432, which can be achieved by mixing the coolant 408 with room temperature air, to provide the coolant temperature 432 at any temperature between the air temperature (e.g., room temperature of 25 C) and temperature of the pure coolant 408. TM instructions 434 can include instructions to trigger a derate function 412, such as a maximum battery temperature derate function or a maximum gradient temperature derate function. For instance, TM instructions 434 can trigger the derate functions 412 to reduce the charge current at which the CS 155 provides the power to, or receives power from, the EV 105 in order to reduce the battery temperature 444 or gradient temperature 446.

Sensors 440 can include any combinations of hardware and software (e.g., devices or detectors) for measuring or detecting signals or environmental conditions. Sensor 440 can include a device or a transducer that detects and measures physical properties, environmental conditions, or changes in a surrounding and provides an electrical signals or other output format indicative of the measurement. Sensors 440 can include temperature sensors for measuring temperature of the battery packs 110, modules 115 or cells 120. For example, sensors 440 can be distributed to measure battery cells 120 across the battery of an EV 105. Sensors can include voltage, current or power sensors, state of charge (SOC) sensors, state of health (SOH) sensors, pressure sensors, humidity sensors, vibration sensors, pressure sensors, stress sensors, accelerometers, gyroscopes, proximity sensors, charge or discharge efficiency sensors, gas sensors or any other type of sensors 440. Sensors 440 can include a fluid flow sensor for measuring the amount of coolant 430 provided to the battery 110.

Measurements 442 can include any measurements or outputs of any sensors 440. Measurements 442 can include measurements of temperature, pressure, current, power, voltage, or any other sensor 440 output. Measurements 442 can be continuous, sampled, periodic or event triggered. Measurements 440 can include a stream of data that can include measurements of the data that can be timestamped and can be used by EV cooler 406 for controlling the amount of coolant 408 output to the battery 110, by TM 410 for implementing derate functions 412 or current controller 462 for controlling current provided to the EV 105 via power cable 160.

Sensors 440 can be used to monitor the battery temperature 444 and the gradient temperature 446 of the EV battery 110. Battery temperature 444 can include a temperature of the EV battery, which can be expressed in the measurements 442 of the sensors 440 during the DCFC charging. Battery temperature 444 can include a maximum temperature of the battery, including a maximum temperature of any of the battery cells 120, battery modules 115 or battery packs. Battery temperature 444 can include a maximum temperature, a minimum temperature, a median temperature, an average temperature or any other measurement of temperature of the battery during the charge.

Battery temperature 444 can be managed by derate functions 412. For instance, DPS 402 can monitor the battery temperature 444 in view of the temperature threshold 422. If the battery temperature 444 reaches or exceeds the temperature threshold 422, thermal manager 410 can trigger a maximum temperature derate function (e.g., derate functions 412). The maximum temperature derate function 412 can cause the charge current to be reduced by the CS 155 in order to bring the battery temperature 444 below the temperature threshold 422.

Gradient temperature 446 can include a difference in temperature between two or more battery cells 120, battery modules 115 or battery packs. Gradient temperature 446 can include a difference between a first temperature of a first battery cell 120 having the highest temperature in the battery 110 and a second temperature of a second battery cell 120 having a lowest temperature in the same battery 110 (e.g., battery pack or module). Gradient temperature 446 can express how the temperature varies across different portions of the battery.

Gradient temperature 446 can be managed by derate functions 412. For instance, DPS 402 can monitor the gradient temperature 446 in view of the gradient threshold 424. If the gradient temperature 446 reaches or exceeds the gradient threshold 424, thermal manager 410 can trigger a maximum gradient derate function (e.g., derate functions 412). The maximum gradient derate function 412 can cause the charge current to be reduced by the CS 155 in order to bring the gradient temperature 446 below the gradient threshold 424.

Battery cooling model 420 can include any type and form of a model for determining cooling for the EV battery 110. Battery cooling model 420 can include an algorithm, a function or a set of rules for determining an amount of cooling to provide to an EV battery 110 during a DCFC. Battery cooling model 420 can include a computational framework designed to optimize the cooling process of the EV battery 110 by considering factors such as the initial state of charge (SOC) 426, target SOC 428, temperature thresholds, and maximum temperature gradient across the battery cells 120. Battery cooling model 420 can determine the amount of cooling that is sufficient to maintain both the overall battery temperature 444 and the gradient temperature 446 within specified thresholds (e.g., 422 and 424), while also maintaining the charge current provided by the CS 155 at the maximum level that is sufficient for the DCFC. By strategically utilizing the coolant 408 (e.g., continuously monitoring the cooling amount provided and the temperature of the battery to adjust the cooling provided), the battery cooling model 420 can maximize the charge current during the DCFC.

Battery cooling model 420 can utilize an initial state of charge 426 and a target state of charge 428 to determine the amount of cooling (e.g., any combination of the coolant amount 430 or the coolant temperature 432) to provide to the EV battery 110. The initial SOC 426 can be a current SOC of the battery 110 and the target SOC 428 can be a level of SOC aimed to be reached via DCFC. By using the initial or current SOC 426 and the target SOC 428, as well as the battery temperature 444 and gradient temperature 446 measurements 442, the battery cooling model 420 can determine the correct coolant amount 430 and coolant temperature 432 to apply, as well as the time durations and timing at which to apply them, to achieve the target SOC 428 within a shortest time period (e.g., highest charge current).

Battery cooling model 420 can utilize inputs into the model to determine the coolant amount 420, the coolant temperature 432 as well as the timing at which to apply the coolant amount 420 at the coolant temperature 432 to minimize the time it takes to charge the battery of the EV 105. The time to charge the EV battery can include, for example, a time duration or period from the start of the EV battery charge until the battery of the EV 105 is charged up to the target SOC 428. Battery cooling model 420 can determine the temporal points (e.g., time points) at which to initiate the release of the coolant 408 at the given coolant amount 430 (e.g., a rate of flow or amount of flow) and at the given coolant temperature 432, as well as temporal points at which to end the release of the coolant. Battery cooling model 420 can determine the timing as well as duration of applying the coolant 408 for the given coolant amount 430 and at the given coolant temperature 432 to achieve a minimal time duration of the EV battery charge (e.g., minimize the duration of the battery charge event).

Figure 5:
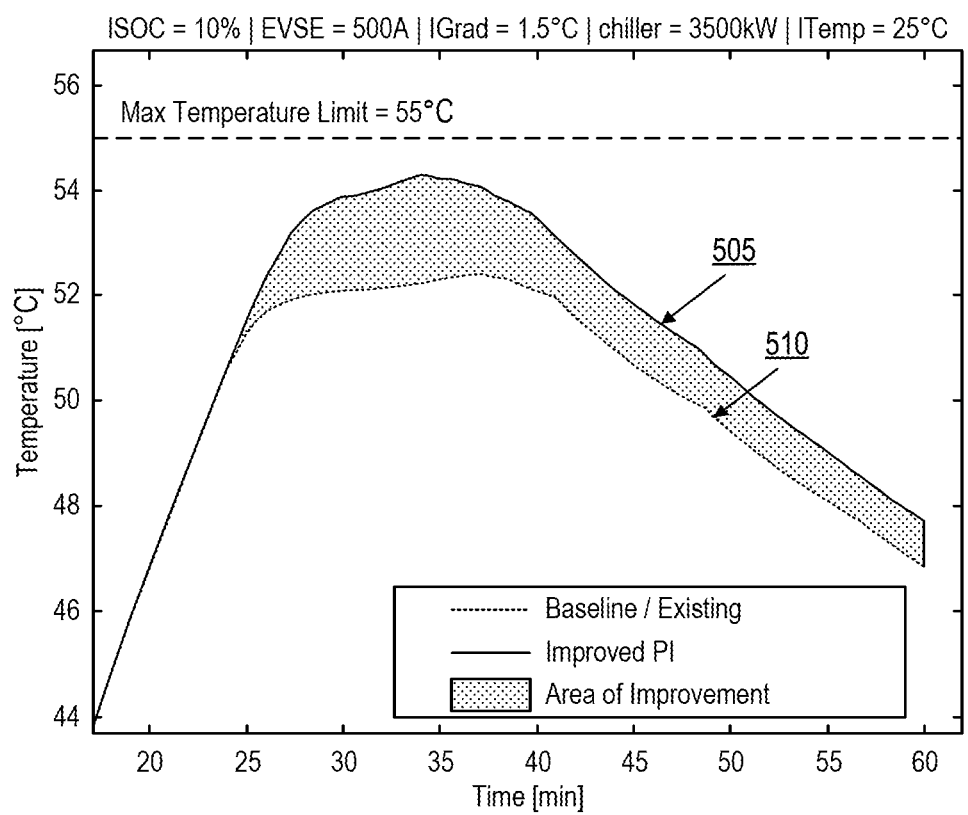
FIG. 5 illustrates an example graph of plots showing performance difference between a DCFC with and without a battery cooling model utilized.

FIG. 5 illustrates an example graph 500 of plots 505 and 510 showing performance difference between a DCFC with and without a battery cooling model utilized. The example 500 includes a configuration in which the initial SOC is 10%, the charge current of the EVSE at 500 A, the initial gradient temperature of the battery of 1.5 C, an EV cooler 406 that is a chiller of 3500 kW and an initial temperature of 25 C. The plot 505 of the technical solutions in which the model based DCFC cooling control is implemented shows the temperature of the battery over a time period of between about 15 and 60 minutes. At minute 15, plot 505 shows the temperature of the battery 110 increasing from 44 C to about 53 C at around minute 25. From about minutes 30-40, the temperature is at about 54 C, and then it is reduced to about 52 C to around minute 45, then down to 50 C at around minute 50 and to 48 C at around minute 55. Plot 510 of a solution without model based DCFC cooling control shows the battery temperature increased from 44 C at minute 15 to about 52 C at around minute 25, remaining at about 52 C through minute 40, and then decreasing to 50 C at around minute 45, to 48 C at around minute 50 and to about 47 C at around minute 60. Accordingly, the graph 500 shows that the technical solution allows the battery to be charged at a temperature that more closely approaches, but does not exceed, the maximum threshold temperature of 55 C, thereby achieving a more efficient charging of the battery.

Figure 6:
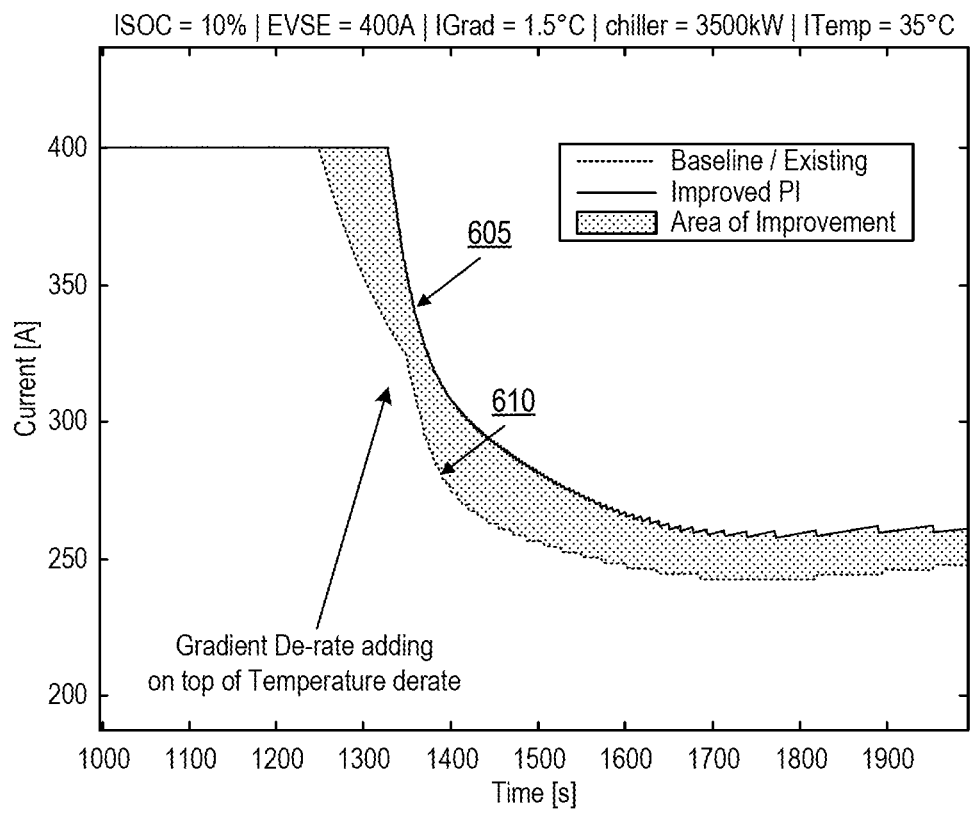
FIG. 6 illustrates an example graph of plots showing performance difference in gradient derating between a DCFC with and without a battery cooling model utilized.

FIG. 6 illustrates an example graph 600 of plots 605 and 610, showing performance difference in gradient derating between a DCFC with and without a battery cooling model utilized. The example 600 includes a configuration in which the initial SOC is 10%, the charge current of the EVSE at 500 A, the initial gradient temperature of the battery of 1.5 C, an EV cooler 406 that is a chiller of 3500 kW and an initial temperature of 35 C. The plot 605 of the technical solutions in which the model based DCFC cooling control is implemented shows the current of the battery over a time period of between about 1000 and 2000 seconds. At plot 605, from second 1000 through 1300, the current remains at 400A, at around second 1400 the current is at 300A, at around second 1500 the current is at 270A, at around second 1600 the current is at 260A and remains at that level through second 2000. The plot 610 of the technical solutions in which the model based DCFC cooling control is not implemented shows the current of the battery over a time period of between about 1000 and 2000 seconds. At plot 610, from second 1000 through 1250, the current remains at 400A, at around second 1300 the current is at 350A, at around second 1400 the current is at 260A, at around second 1600 the current is at 250A and remains at that level through second 2000. Accordingly, the graph 600 shows that the technical solution allows the battery to be charged at higher current levels for a longer period of time even when derate functions are applied.

Figure 7A:
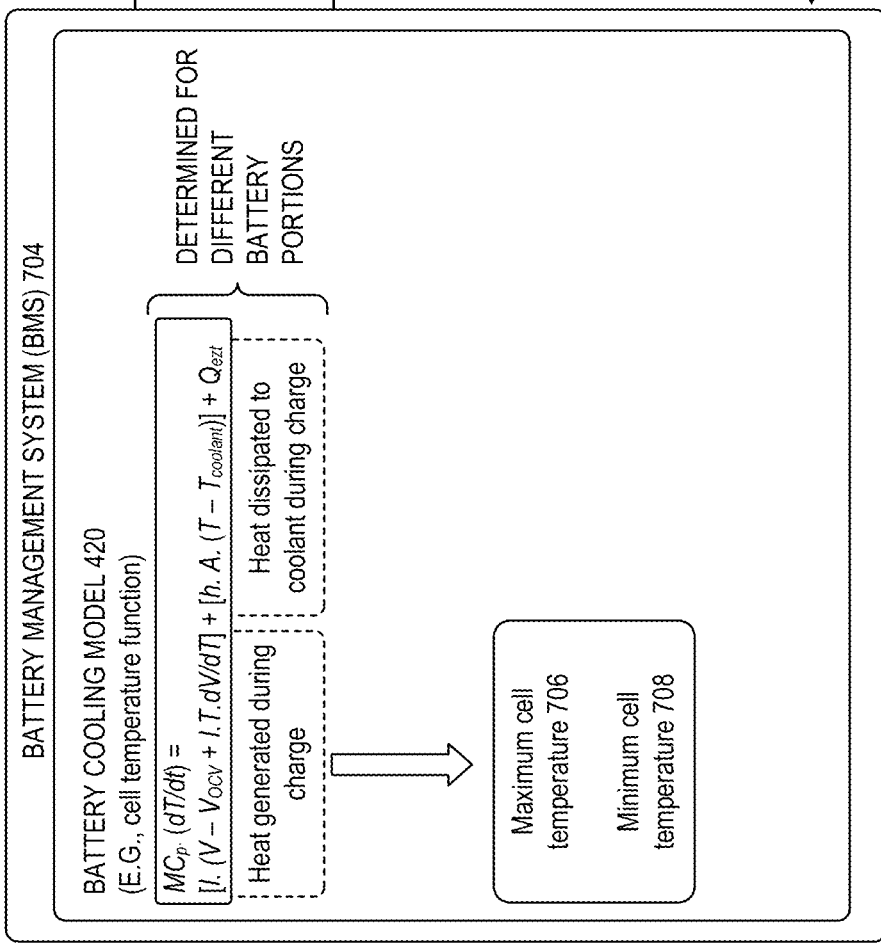
FIGS. 7A and 7B illustrate views of an example system with a battery management system (BMS) and a thermal manager (TM) implementing a model based DCFC cooling control.
Figure 7B:
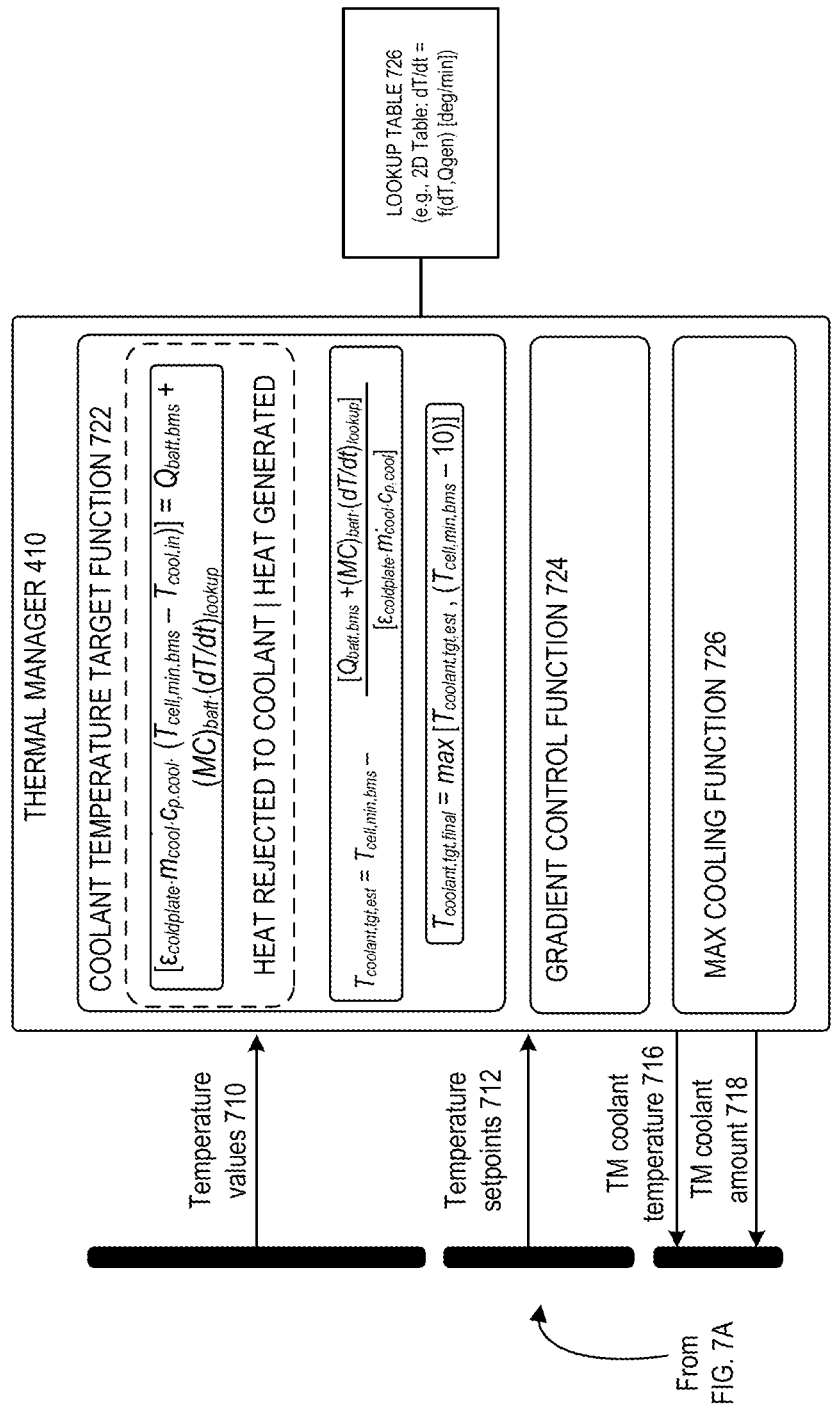

FIGS. 7A and 7B illustrate views 702 and 720 of an example system 700 with a battery management system (BMS) and a thermal manager (TM) implementing a model based DCFC cooling control. The example system 700 can be used in combination with the system 400 or any other example features discussed herein. At FIG. 7A, view 702 illustrates a BMS 704 of a DPS 402 that can include a battery cooling model 420 implementing a cell temperature function (e.g., a battery cooling model 420). The cell temperature function (e.g., 420) can determine and monitor an amount of heat generated by any part of a battery 110, including each individual cell, a group of cells, each module, a group of modules, or each battery pack or a group of battery packs. The cell temperature function (e.g., 420) can determine the amount of heat rejected to the coolant 408 and provide a variety of outputs, such as temperature values 710 and temperature setpoints 712, as well as receive from the TM 420 different coolant data 714. The cell temperature function (e.g., 420) can generate TM instructions 434 to trigger release of the amount of cooling (e.g., a particular amount of coolant 430 at a given coolant temperature 432) at a particular point in time during the charge event (e.g., duration of the charge of the EV battery). The cell temperature function can determine and output the timing for applying a particular (e.g., determined) amount of cooling to the EV battery so as to maintain the charge current at elevated levels (e.g., relying on cooling to avoid triggering derate functions 412), thereby minimizing the duration of the charge of the EV battery.

Battery management system 704, also referred to as a BMS 704 can include any combination of hardware and software for overseeing the operation and health of a battery (e.g., 110, 115 or 120) of an EV 105. Within a DPS 402, a BMS 704 can incorporate a function to determine and manage (e.g., increase or decrease) temperature of any portion of a battery, including one or more cells 120, modules 115 or battery packs. BMS 704 can use the battery cooling model 420 to determine a cell temperature function to calculate the heat generated during DCFC and the corresponding heat rejected to the coolant. The BMS's battery cooling model 420 can establish various temperature values 710 and temperature setpoints 712 for any portion of a battery (e.g., any one or more cells 120, modules 115 or battery packs 110). Battery cooling model 420 can receive coolant data 714 (e.g., coolant flow or coolant temperature) and use such data to adjust temperature setpoints 712 for cooling the battery.

Temperature values 710 can include, for example, various temperature thresholds for maximum and minimum operating or target temperatures, derate minimum and maximum temperatures and nominal minimum and maximum temperatures. Temperature setpoints 712 can include temperature heating or cooling setpoints for providing a temperature limit at which the cooling can begin, or a temperature limit set point down to which the battery (e.g., battery cell 120, module 115 or pack 110) can be cooled. Temperature setpoints 712 can include temperature thermal gradient setpoints for triggering or operating a thermal conditioning (e.g., cooling) at directed portions of battery (e.g., one or more cells 120, modules 115 or packs 110) to achieve a desired thermal gradient (e.g., reduce the thermal gradient to below a particular threshold). For example, battery cooling model 420 can generate a maximum cell temperature 706 value and a minimum cell temperature value 708 which can be used as inputs to the TM 410 (e.g., TM instructions 434), or as temperature setpoints 712.

Battery cooling model 420 can include a function for determining dynamic changes in temperature of at least a portion of a battery (e.g., one or more cells 120, modules 115 or packs 110) over time. Battery cooling model 420 can continuously recalculate (e.g., periodically determine) the amount of cooling to provide to the EV battery and the timing at which to provide that particular amount of cooling (e.g., coolant amount 430 at a given coolant temperature 432) to avoid triggering derate functions 412 and to minimize the duration of the EV battery charge event. For instance, the cell temperature function can be expressed as: MCp·(dT/dt)=[I.(V−Vocv+I.T.dV/dT]+ [h. A. (T−Tcoolant)]+Qezt. The term (V−Vocv+I.T.dV/dT] can account for the heat generated during the charging process, where I can represent the charging current, V can represent the voltage, Vocv can represent open-circuit voltage, T can represent the temperature and dV/dT can represent the rate of change of voltage with respect to the temperature. The term [h. A. (T−Tcoolant)] can represent the heat dissipated to the coolant 408 during the charge, where h can represent the heat transfer coefficient, A can represent the surface area for the heat transfer, T can represent the temperature and T coolant can represent the coolant temperature 432. Qezt can represent an additional factor contributing to the heat transfer, such as heat that can be dissipated to things other than the coolant.

At FIG. 7B, example system 700 includes a view 720 in which a TM 420 receives temperature values 710 and temperature setpoints 712 from the BMS 704 and provides coolant data 714, including TM coolant temperature 716 and TM coolant amount 718 to the BMS 704 (e.g., for use by the battery cooling module 420). TM 410 can include a coolant temperature target function 722 which can include any functionality (e.g., circuitry, computer code or instructions) for implementing providing targeted or specified cooling to the battery of the EV 105.

Coolant temperature target function 722 can include any combination of hardware and software for implementing targeted and controlled cooling of the battery via EV cooler 406. Coolant temperature target function 722 can include the functionality for providing particular setpoints (e.g., temperature setpoints 712) to the EV cooler 406 to provide a particular level of cooling (e.g., at a combination of a particular coolant amount 430 at a particular coolant temperature 432). The particular coolant amount 430 can include a set flow of coolant (e.g., any ratio of room temperature air with refrigerated or cooled air-conditioned air) to provide a particular coolant temperature 432, or a particular coolant flow rate at a particular coolant temperature 432.

Thermal manager 410 can include a gradient control function 724 to provide a particular gradient temperature control across various parts of the battery (e.g., across one or more cells 120, battery modules 115 or battery packs). Gradient control function 724 can control the coolant flow to the battery to facilitate reduction of the gradient temperature across various portions of the battery. For example, gradient control function 724 can adjust the coolant temperature 432 and the coolant amount 430 to facilitate a particular type of cooling of the battery so as to maintain the gradient temperature 446 below a gradient threshold 424.

Thermal manager 410 can include a maximum temperature cooling function 726, also referred to as a max cooling function 726, to provide a particular maximum temperature cooling to the battery to facilitate reduction of the maximum temperature at the battery. Max cooling function 726 can include the functionality for reducing temperature across the entire battery, or any one or more parts of the battery (e.g., cells 120, modules 115 or packs 110). Max cooling function 726 can operate according to temperature setpoints 712 to facilitate DCFC operation while maintaining the battery temperature 444 below a temperature threshold 422.

Coolant temperature target function 722, along with the gradient control function 724 and the max cooling function 726 can measure or generate TM coolant temperature 716 and the TM coolant amount 718 to be provided as coolant data 714 to the BMS 704. The max cooling function 726 can facilitate maximum amount of cooling based on a time, such that maximum cooling is facilitated or activated when maximum temperature of the battery (e.g., a battery part) is greater than the temperature at which derate function is activated plus an offset temperature. The offset temperature can be, for example, 2 C. In such an example, maximum cooling can be applied when maximum temperature of the battery is under a set threshold level (e.g., 2 C) away from reaching the derate temperature.

TM coolant temperature 716 can include the temperature of the coolant 408 being provided to the battery as measured by one or more sensors 440. TM coolant amount 718 can include the rate or flow of coolant (e.g., amount per unit of time) of the coolant provided to the battery. TM 410 can utilize these parameters to update the battery cooling model 420 at the BMS 704, thereby facilitating the operation of the battery cooling model 420 to continuously recalculate the updated temperature setpoints 712 or temperature values 710.

To determine the rate of change of the temperature with respect to the time (e.g., from the start of the DCFC charge), the TM 410 can utilize a lookup table 726. The lookup table 726 can include a table of values showing a columns of changes in temperature as a function of degrees with rows corresponding to the watts of heat generated. For example, the lookup table 726 can allow the TM 410 to identify the solution to dT/dt=f(dT,Qgen) in terms of degrees per minute, allowing the TM 410 to identify the timing at which the temperature will reach the derate function thresholds (e.g., activating the derate functions). The lookup table 726 can facilitate determining the transient heat generated (e.g., DT/dt).

Accordingly, coolant temperature target function 722 can include or implement an algorithm or a function that can be expressed as: $[\varepsilon_{coldplate} \cdot m_{cool} \cdot cp \cdot_{cool} \cdot (Tcell,min,bms-Tcool,in)]$=Qbatt,bms+ (MC)batt·(dT/dt)lookup, where $\varepsilon_{coldplate}$ can be the thermal efficiency of the cold plate, $m_{cool}$ can be the mass flow rate of the coolant, $cp \cdot_{cool}$ can be the specific heat capacity of the coolant, Tcell,min,bms can be the minimum allowable temperature for the battery cell (e.g., as determined by the BMS), Tcool,in can be the temperature of the coolant entering the cold plate, Qbatt,bms, can be the heat generated or absorbed by the BMS, (MC) batt can be an effective heat capacity of the battery and the dT/dt can be the rate of change of temperature with respect to time as looked up in the lookup table 726.

TM 410 can include the target coolant temperature estimation that can include or implement an algorithm or a function that can be expressed as:

$$T_{codant,tgt,est} = T_{cell,min,bms} - \frac{\left[Q_{batt,bms} + (MC)_{batt} - (dT/dt)_{lookup}\right]}{[\varepsilon_{coldplate} \cdot m_{cod} \cdot c_{p,cool}]},$$

where Tcoolant,tgt,est can be a determination for a target coolant temperature, Tcell,min,bms can be the minimum allowable temperature for the battery cell, as determined by the BMS, Qbatt,bms can be the heat generated or absorbed by the battery, controlled by the BMS, (MC) batt can be the effective heat capacity of the battery, (dT/dt) lookup can be the rate of change of temperature with respect to time as determined from the lookup table, εcoldplate can be the thermal efficiency of the cold plate, mcool can be the mass flow rate of the coolant circulating through the cold plate and Cp.cool can be the specific heat capacity of the coolant.

TM 410 can include the final target temperature that can include or implement an algorithm or a function that can be expressed as follows:

$$T_{coolant,tgt,final} = \max[T_{coolant,tgt,est}, (T_{cell, min, bms}-10)],$$

where Tcoolant,tgt,final can represent the final target coolant temperature, which can be the desired temperature for the coolant circulating through the cold plate, Tcoolant,tgt,est can be the estimated target coolant temperature, and Tcell,min,bms can be the minimum allowable temperature for the battery cell, as determined by the BMS 704.

Figure 8:
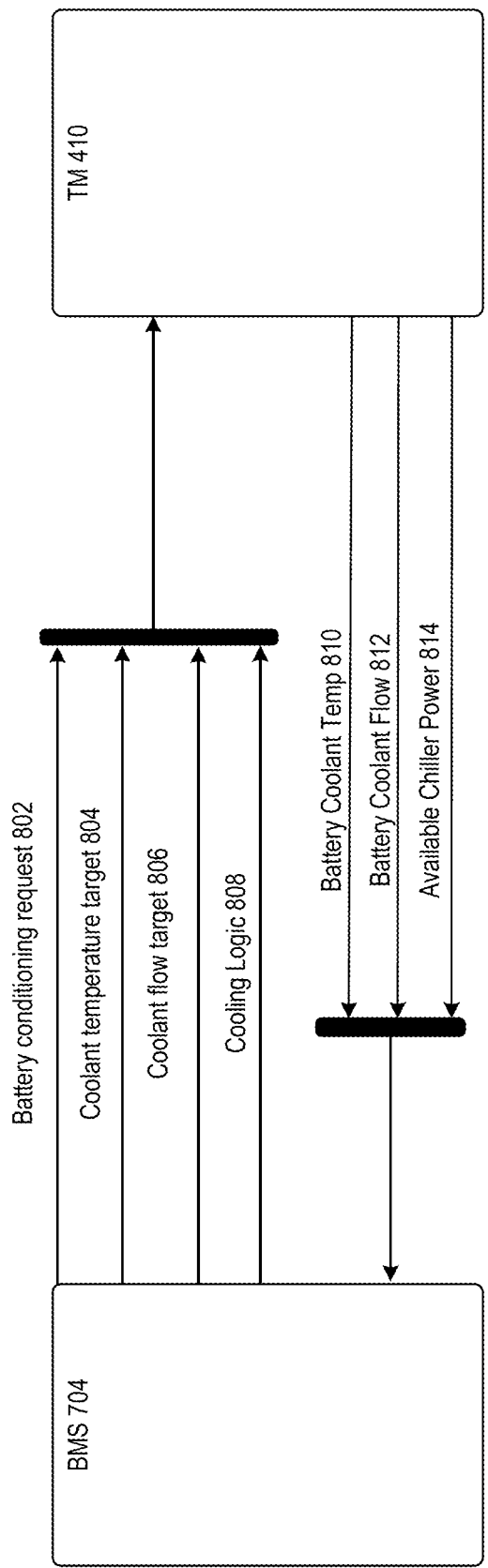
FIG. 8. illustrates an example of a system for utilizing a BMS and a thermal manager to implement a model-based cooling control of an EV battery during DCFC.

FIG. 8. illustrates an example of a system 800 for utilizing a BMS 704 and a thermal manager 410 to implement a model based cooling control of an EV battery during DCFC. The system 800 can be included within, or work together with, example systems 400 and 700, such as being implemented on a computer system (e.g., processors 310 and computer code, functions or algorithms stored or implemented using memories 315, 320 or 325). BMS 704 can send to a TM 410 a battery conditioning request 802, a temperature target 804, a coolant flow target 806 and a cooling logic 808. TM 410 can send to the BMS 704 a battery coolant temperature 810, a battery coolant flow 812 and an available chiller power 814.

The battery conditioning request 802 can include any message or a request for initiating or activating model based cooling of the EV battery. The battery conditioning request 802 can include data output from the battery cooling model 420, which the TM 410 can use to implement cooling of the battery. Battery conditioning request 802 can include one or more coolant temperature targets 804 or coolant flow targets (e.g., temperature setpoints 712 or temperature values 710) which the TM 410 can use to generate controls or instructions for the EV cooler 406 to provide a particular cooling amount. Coolant temperature target 804 can include a particular temperature of the coolant 408 to be used, whereas a coolant flow target 806 can include a flow rate of the coolant 804 to be used. Cooling logic 808 can include time duration for which to provide the coolant 408 at the given coolant temperature target 804 or coolant flow target 806. Cooling logic 808 can include maximum and minimum thresholds for particular derate functions, gradient target temperatures, maximum temperature target temperature, current temperature readings or any other information about the thermal state of the battery.

TM 410 can provide a BMS 704 with a battery coolant temperature 810, battery coolant flow 812 and available chiller power 814. Battery coolant temperature 810, battery coolant flow 812 and available chiller power 814 can include feedback signals provided to the battery cooling model 420 to continue updating the determinations for the cooling of the battery. The battery coolant temperature 810 can include a measurement 442 of a sensor 440 measuring the coolant temperature delivered to the battery. By adjusting the coolant temperature 432 (e.g., mixing room temperature air with air conditioned cool air in specific ratios to achieve particular temperature, or increasing cooling of the air) or the coolant amount 430 (e.g., the rate at which coolant 408 is provided) the battery coolant temperature 810 can change. Battery coolant flow 812 can provide a real time update as to the flow of the coolant, which DPS 402 can update as desired to achieve a given thermal output. Available chiller power 814 can include available capacity of the EV cooler 406 to provide additional cooling, to the extent desired. Available chiller power 814 can inform the DPS 402 of the limits of the EV cooler 406.

In one aspect, the technical solutions are directed to a system, such as a system 400, which can include any features of a system 700, system 800 or any other example discussed herein to implement a model based cooling control to facilitate a more efficient DCFC of an EV 105. System 400 can be implemented using a computer system 300, such as for example, using one or more instructions, commands, data, functions or algorithms that can be stored in memories 315, 320 or 325 and executed on one or more processors 310 of a DPS 402. For example, system 400 can include a non-transitory computer-readable media storing processor readable instructions, such that, when executed, the instructions cause at least one processor to implement the functionality of the DPS 402.

For example, the system 400 can include a DPS 402 implemented on at least one processor 310 coupled with memory (e.g., 315, 320 or 325). The one or more processors 310 can be configured (e.g., execute instructions or computer code stored in memory 315, 320 or 325) to identify a state of charge (SOC) of a battery 110 of an electric vehicle 105. The identified SOC can include an initial SOC 426 corresponding to the current state of the battery. The battery can include one or more battery packs 110, battery modules or battery cells 120. The one or more processors 310 can be configured to identify a temperature threshold (e.g., 422) for a battery temperature 444 and a gradient threshold 424 for a difference in temperature (e.g., 444) between at least two cells 120 of the battery (e.g., a battery pack 110).

The one or more processors 310 can be configured to determine an amount of cooling (e.g., heat dissipation, including a cooling amount or rate of coolant flow) to apply during a charge of the battery. The charge of the battery can include an event during which a DCFC is applied to the charge or replenish the EV battery 110. The cooling amount 430 can be determined based at least on the SOC (e.g., 426), the temperature of the battery (e.g., 444) and the gradient temperature 446 (e.g., the difference in temperature between two battery cells 120 or to portions of the battery 110) which can be input into a battery cooling model (420). The battery cooling model 420 can be configured to cool the battery or dissipate the heat from the battery (e.g., 110) in order to maintain the battery temperature 444 below the battery temperature threshold (e.g., 422) and the difference in temperature (e.g., the gradient temperature 446) below the gradient threshold 424. By maintaining the battery temperature 444 and the gradient temperature 446 below the thresholds 422 and 424, the DPS 402 can implement the DCFC charging at the maximum current without triggering the derate functions 412, which can reduce the charge current and prolong the duration of the battery charge.

The one or more processors 310 can be configured to provide to the battery (e.g., 110) the amount of cooling (e.g., any combination of one or more of the coolant amounts 430 and the coolant temperature 432) determined by the model (e.g., 420). The amount of cooling (e.g., 430 and 432) can be determined, selected or provided so as to operate the EV cooler 406 according to the coolant amount 430 and the coolant temperature 432 to maintain the battery temperature 444 below the temperature threshold 422 and to maintain the difference in temperature (e.g., gradient temperature 446) below the gradient threshold 424 during the charge (e.g., implementation of the DCFC between the initial SOC 426 and the target SOC 428).

The one or more processors 310 can be configured to identify a target SOC 428 to achieve at the end of the charge of the EV battery and can determine the amount of cooling (e.g., any combination of the coolant amount 430 and the coolant temperature 432) to apply during the charge of the battery to achieve the target SOC 428. The one or more processors can determine a time during the charge of the battery at which to apply the amount of cooling (e.g., any coolant amount 430 at any coolant temperature 432) to minimize a duration of the charge of the battery. For instance, the one or more processors 310 can determine the maximum charge current at which to charge the EV battery during the EV battery charge event, so as to utilize any amount of cooling, such that battery temperature 444 does not exceed either the temperature threshold 422 nor the gradient threshold 424, avoiding to trigger the derate functions 412. The one or more processors 310 can provide to the battery 110, during the charge of the battery, the amount of cooling at the determined time to achieve the target SOC. For instance, the battery cooling model 420 can determine the amount of cooling as well as the timing at which to apply the determined amount of cooling, based at least on the initial state of charge 426 and the target state of charge 428 input into the battery cooling model 420.

The one or more processors 310 can be configured to determine the amount of cooling based at least on an amount of flow of a coolant 408 to apply during the charge. The amount of flow can include a rate of fluid flow of the coolant 408 over a period of time. The one or more processors 310 can be configured to determine a time at which to provide the amount of cooling during the charge of the battery and to provide to the battery (e.g., 110), at the determined time and during the charge of the battery, the amount of flow of the coolant 408 determined by the battery cooling model 420. The amount of flow can be provided based at least on a measurement 442 of the amount of flow of the coolant 408 provided to the battery by a flow sensor 440 of the EV 105.

The one or more processors 310 can be configured to determine the amount of cooling based at least on a coolant temperature 432 to apply during the charge (e.g., DCFC event). The one or more processors 310 can be configured to cause an EV cooler 406 to provide to the battery 110, during the charge of the battery, the coolant 408 at the coolant temperature 432 determined by the battery cooling model 420. The coolant temperature 432 can be provided by combining a cooled or air-conditioned air at a lower temperature with a room temperature air to set a particular coolant temperature 432 between the air-conditioned temperature (e.g., between 35 and 55 degrees Fahrenheit) and room temperature air (e.g., 70 degrees Fahrenheit).

The one or more processors 310 can be configured to determine, using the battery cooling model 420, a time to provide the amount of cooling to the battery. The time can be a particular minute or second with respect to a start of a DCFC charge. The time can include a particular time period or a time duration during which to provide the cooling. The one or more processors 310 can be configured to cause an EV cooler 406 to provide to the battery the amount of cooling at the time determined using the battery cooling model 420. For example, the one or more processors 310 can utilize the TM 410 to control the EV cooler 406 to provide the amount of cooling at the particular time.

The one or more processors 310 can be configured to receive from a BMS 704 a setpoint for cooling a cell 120 of the at least two cells (e.g., or at least two parts of the battery). The one or more processors 310 can be configured to determine the amount of cooling based at least on the setpoint. The setpoint can be a setpoint of temperature or flow of the coolant 408 at which to cool the battery. The setpoint can be a temperature setpoint 712. The setpoint can be a setpoint of a particular amount of heat to remove from the battery. The at least two cells of the battery can include a first cell of a plurality of cells of the battery having a first temperature that is lower than each temperature of each other cell of the plurality of cells and a second cell of the plurality of cells having a second temperature that is higher than each temperature of each other cell of the plurality of cells of the battery.

The one or more processors 310 can be configured to determine an amount of current at which to charge the battery based at least on the amount of cooling. The one or more processors 310 can be configured to set the current at which to charge the battery according to the determined amount. For example, in response to a battery temperature 444 exceeding the temperature threshold 422 or the gradient temperature 446 exceeding the gradient threshold 424, the DPS 402 can reduce the current at which the charge is implemented to reduce the battery temperature 444 or the gradient temperature 446.

Figure 9:
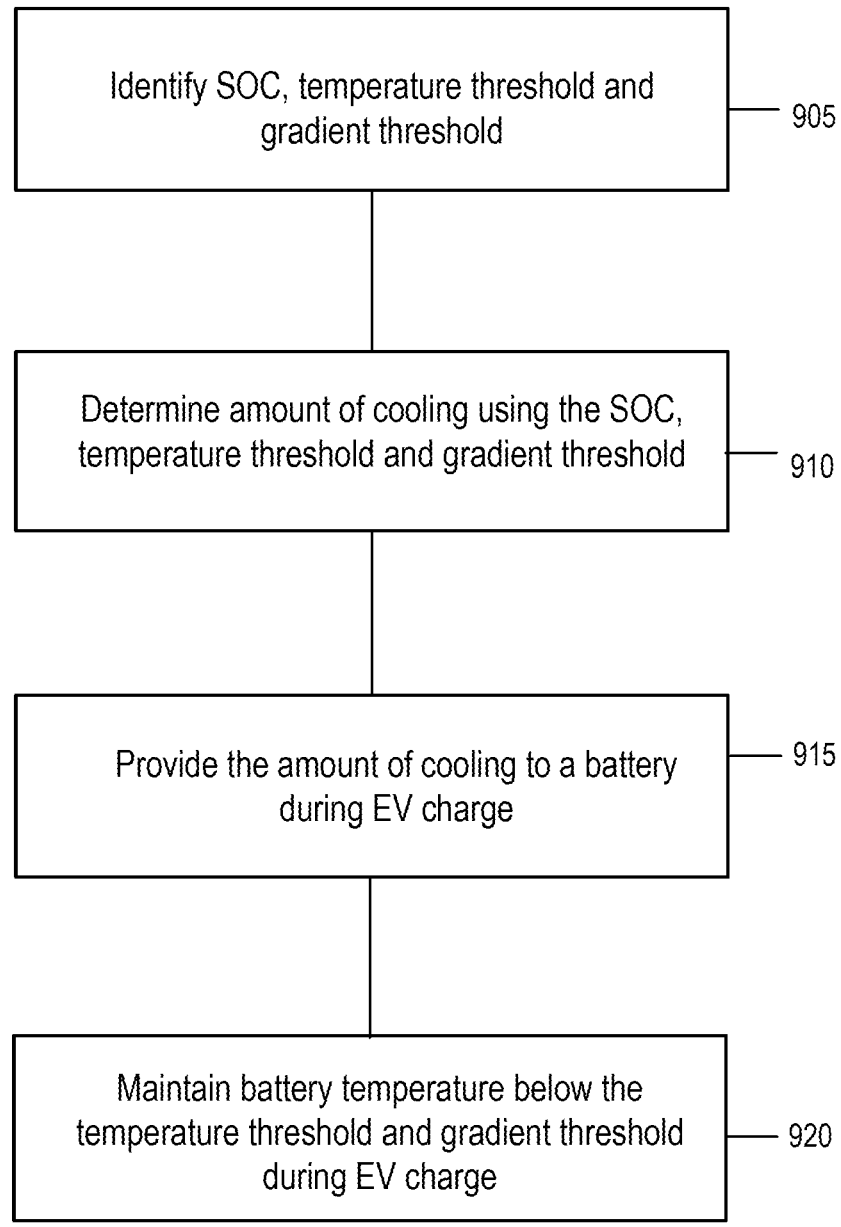
FIG. 9 illustrates a method of providing a model-based cooling of an EV battery to facilitate a DCFC of the battery at an improved charge current during a charge event.

FIG. 9 illustrates a method 900 of providing a model-based cooling of an EV battery to facilitate a DCFC of the battery at an improved charge current during a charge event. The method 900 can be performed by one or more systems or components depicted in FIGS. 1-8, including, for example, a data processing system having a battery cooling model implemented on one or more processors of a computer system. In brief overview, the method 900 can include ACTS 905-920. At ACT 905, the method can include identifying an SOC, a temperature threshold and a gradient threshold. At ACT 910, the method can include determining amount of cooling using the SOC, the temperature threshold and the gradient threshold. At ACT 915, the method can include providing the amount of cooling to a battery during the EV charge. At ACT 920, the method can include maintaining the battery temperature below the temperature threshold and the gradient threshold during the EV charge.

At ACT 905, the method can include identifying an SOC, a temperature threshold and a gradient threshold. The method can include the one or more processors coupled with memory identifying a state of charge (SOC) of a battery of an EV. The state of charge can be an initial SOC, such as a SOC of the battery (e.g., energy level in the EV battery) at the time of start of the EV charge (e.g., DCFC event). The method can include the one or more processors identifying a target SOC (e.g., a SOC to reach at the end of the charge). The one or more processors can identify a temperature threshold for a temperature of the battery and a gradient threshold for a difference in temperature between at least two cells of the battery. The one or more processors can identify a target SOC to achieve, such as a target SOC (e.g., 80% of the full charge of a battery) to be achieved at the end of the DCFC charge event, when the charge event begins at initial SOC (e.g., 10% of the full charge of the battery).

The temperature of the battery can include a maximum temperature of the battery (e.g., the highest temperature within the battery, such as a highest temperature at a cell of a plurality of cells). The temperature of the battery can include a median or an average temperature of the battery, or a temperature range of the battery. The gradient threshold can be a threshold for a gradient temperature. The gradient temperature can include a difference in temperature between two groups of cells, two modules of the battery (e.g., where each module includes a plurality of cells), two battery packs of the battery or any two portions of the battery. The gradient threshold can include a difference in temperature between a first temperature of a first cell having a highest temperature out of a plurality of cells and a second temperature of a second cell having the lowest temperature of the plurality of cells. For instance, the at least two cells of the battery can include a first cell of a plurality of cells of the battery having a first temperature that is lower than each temperature of each other cell of the plurality of cells and a second cell of the plurality of cells having a second temperature that is higher than each temperature of each other cell of the plurality of cells of the battery.

At ACT 910, the method can include determining amount of cooling using the SOC, the temperature threshold and the gradient threshold. The method can include the one or more processors determining an amount of cooling to apply during a charge of the battery (e.g., DCFC event) based at least on the SOC (e.g., initial SOC), the temperature of the battery and the difference in temperature input into a model. The model can include a battery cooling model for cooling the battery to maintain the temperature below the temperature threshold and to maintain the difference in temperature below the gradient threshold. The amount of cooling can be determined based at least on the target SOC input into the model, a temperature value input into a model, temperature setpoint input into the model, or a coolant data input into the model.

The method can include the one or more processors determining the amount of cooling to apply during the charge to achieve the target SOC. The amount of cooling can include an amount of heat to remove from the battery. The amount of cooling can be defined, described or correspond to any combination of an amount of coolant or a temperature of the coolant to provide to the battery. The method can include the one or more processors determining the amount of cooling based at least on an amount of flow of a coolant to apply during the charge. The method can include the one or more processors determining the amount of cooling based at least on a temperature of the coolant to apply during the charge.

The method can include the one or more processors determining, using the battery cooling model, a time to provide the amount of cooling to the battery. The method can include the one or more processors determining a time, during the charge of the battery, at which to apply the amount of cooling to minimize a duration of the charge of the battery. For instance, the method can determine a time at which to activate the delivery of the cooling using the amount of coolant and the temperature of the coolant. The time can correspond to a particular point in time during the charge event at which the determined amount of cooling will allow for the charge current to remain elevated and generating heat, but the generated heat will not trigger the temperature threshold or the gradient threshold of the battery, allowing for minimized time duration of the EV battery charge event. The method can include the one or more processors receiving, from a battery management system, a setpoint for cooling a cell of the at least two cells and determining the amount of cooling based at least on the setpoint. The method can include the one or more processors determining an amount of current at which to charge the battery based at least on the amount of cooling.

At ACT 915, the method can include providing the amount of cooling to a battery during the EV charge. The method can include the one or more processors providing to the battery, the amount of cooling determined by the model. The method can include the one or more processors providing the cooling during the EV charge, such as a direct current fast charging (DCFC). The method can include the one or more processors providing to the battery the amount of cooling determined by the model during the charge to achieve the target SOC. The method can include the one or more processors providing to the battery the amount of flow of the coolant determined by the model during the charge of the battery.

The method can include the one or more processors cause an EV cooler to provide to the battery, during the charge of the battery, the amount of cooling at the temperature of the coolant determined by the model. The method can include the one or more processors cause the cooler to provide to the battery the amount of coolant at the time determined using the model. For example, the amount of coolant can be provided for a time duration (e.g., a period of time). The amount of coolant can be provided at a particular rate of coolant. The amount of cooling can be provided at a particular time referenced from the start of the DCFC event or determined according to a lookup table.

At ACT 920, the method can include maintaining the battery temperature below the temperature threshold and the gradient threshold during the EV charge. The method can include the one or more processors maintaining the temperature of the battery below the temperature threshold. The method can include the one or more processors maintaining the difference in temperature between the at least two cells of the battery, or any other two portions of the battery, below the gradient threshold for a duration of the charge. For instance, the one or more processors can update the amount of cooling to provide, determine the time to turn on the cooling and turn off the cooling, adjust the coolant temperature or the coolant flow rate in order to maintain the battery temperature below the temperature threshold and the gradient temperature below the gradient threshold.

The method can include the one or more processors setting the current at which to charge the battery according to the determined amount. For instance, the one or more processors can implement one or more derate functions in response to a battery temperature exceeding the temperature threshold or the gradient temperature exceeding the gradient threshold. The one or more derate functions can reduce the current at which the EV is charged during the DCFC until the battery temperature falls back below the temperature threshold or the gradient temperature falls below the gradient threshold. The data processing system can continuously adjust, during the DCFC event, any one or more of: the coolant amount, coolant temperature or utilize derate functions for various time durations in order to maximize the current at which the EV battery is charged, maximize the rate at which the EV battery is being charged or minimize the time duration to achieve the target SOC.

Some of the description herein emphasizes the structural independence of the aspects of the system components or groupings of operations and responsibilities of these system components. Other groupings that execute similar overall operations are within the scope of the present application. Modules can be implemented in hardware or as computer instructions on a non-transient computer readable storage medium, and modules can be distributed across various hardware or computer-based components.

The systems described above can provide multiple ones of any or each of those components and these components can be provided on either a standalone system or on multiple instantiations in a distributed system. In addition, the systems and methods described above can be provided as one or more computer-readable programs or executable instructions embodied on or in one or more articles of manufacture. The article of manufacture can be cloud storage, a hard disk, a CD-ROM, a flash memory card, a PROM, a RAM, a ROM, or a magnetic tape. In general, the computer-readable programs can be implemented in any programming language, such as LISP, PERL, C, C++, C#, PROLOG, or in any byte code language such as JAVA. The software programs or executable instructions can be stored on or in one or more articles of manufacture as object code.

Example and non-limiting module implementation elements include sensors providing any value determined herein, sensors providing any value that is a precursor to a value determined herein, datalink or network hardware including communication chips, oscillating crystals, communication links, cables, twisted pair wiring, coaxial wiring, shielded wiring, transmitters, receivers, or transceivers, logic circuits, hard-wired logic circuits, reconfigurable logic circuits in a particular non-transient state configured according to the module specification, any actuator including at least an electrical, hydraulic, or pneumatic actuator, a solenoid, an op-amp, analog control elements (springs, filters, integrators, adders, dividers, gain elements), or digital control elements.

The subject matter and the operations described in this specification can be implemented in digital electronic circuitry, or in computer software, firmware, or hardware, including the structures disclosed in this specification and their structural equivalents, or in combinations of one or more of them. The subject matter described in this specification can be implemented as one or more computer programs, e.g., one or more circuits of computer program instructions, encoded on one or more computer storage media for execution by, or to control the operation of, data processing apparatuses.

Alternatively, or in addition, the program instructions can be encoded on an artificially generated propagated signal, e.g., a machine-generated electrical, optical, or electromagnetic signal that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. While a computer storage medium is not a propagated signal, a computer storage medium can be a source or destination of computer program instructions encoded in an artificially generated propagated signal. The computer storage medium can also be, or be included in, one or more separate components or media (e.g., multiple CDs, disks, or other storage devices include cloud storage). The operations described in this specification can be implemented as operations performed by a data processing apparatus on data stored on one or more computer-readable storage devices or received from other sources.

The terms "computer device", "component" or "data processing system" or the like encompass various apparatuses, devices, and machines for processing data, including by way of example a programmable processor, a computer, a system on a chip, or multiple ones, or combinations of the foregoing. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, app, script, or code) can be written in any form of programming language, including compiled or interpreted languages, declarative or procedural languages, and can be deployed in any form, including as a stand-alone program or as a module, component, subroutine, object, or other unit suitable for use in a computing environment. A computer program can correspond to a file in a file system. A computer program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatuses can also be implemented as, special purpose logic circuitry, e.g., an FPGA (field programmable gate array) or an ASIC (application specific integrated circuit). Devices suitable for storing computer program instructions and data can include non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

The subject matter described herein can be implemented in a computing system that includes a back end component, e.g., as a data server, or that includes a middleware component, e.g., an application server, or that includes a front end component, e.g., a client computer having a graphical user interface or a web browser through which a user can interact with an implementation of the subject matter described in this specification, or a combination of one or more such back end, middleware, or front end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

While operations are depicted in the drawings in a particular order, such operations are not required to be performed in the particular order shown or in sequential order, and all illustrated operations are not required to be performed. Actions described herein can be performed in a different order.

Having now described some illustrative implementations, it is apparent that the foregoing is illustrative and not limiting, having been presented by way of example. In particular, although many of the examples presented herein involve specific combinations of method acts or system elements, those acts, and those elements may be combined in other ways to accomplish the same objectives. Acts, elements and features discussed in connection with one implementation are not intended to be excluded from a similar role in other implementations or implementations.

The phraseology and terminology used herein is for the purpose of description and should not be regarded as limiting. The use of "including" "comprising" "having" "containing" "involving" "characterized by" "characterized in that" and variations thereof herein, is meant to encompass the items listed thereafter, equivalents thereof, and additional items, as well as alternate implementations consisting of the items listed thereafter exclusively. In one implementation, the systems and methods described herein consist of one, each combination of more than one, or all of the described elements, acts, or components.

Any references to implementations or elements or acts of the systems and methods herein referred to in the singular may also embrace implementations including a plurality of these elements, and any references in plural to any implementation or element or act herein may also embrace implementations including only a single element. References in the singular or plural form are not intended to limit the presently disclosed systems or methods, their components, acts, or elements to single or plural configurations. References to any act or element being based on any information, act or element may include implementations where the act or element is based at least in part on any information, act, or element.

Any implementation disclosed herein may be combined with any other implementation or embodiment, and references to "an implementation," "some implementations," "one implementation" or the like are not necessarily mutually exclusive and are intended to indicate that a particular feature, structure, or characteristic described in connection with the implementation may be included in at least one implementation or embodiment. Such terms as used herein are not necessarily all referring to the same implementation. Any implementation may be combined with any other implementation, inclusively or exclusively, in any manner consistent with the aspects and implementations disclosed herein.

References to "or" may be construed as inclusive so that any terms described using "or" may indicate any of a single, more than one, and all of the described terms. References to at least one of a conjunctive list of terms may be construed as an inclusive OR to indicate any of a single, more than one, and all of the described terms. For example, a reference to "at least one of 'A' and 'B'" can include only 'A', only 'B', as well as both 'A' and 'B'. Such references used in conjunction with "comprising" or other open terminology can include additional items.

Where technical features in the drawings, detailed description or any claim are followed by reference signs, the reference signs have been included to increase the intelligibility of the drawings, detailed description, and claims. Accordingly, neither the reference signs nor their absence have any limiting effect on the scope of any claim elements.

Modifications of described elements and acts such as variations in sizes, dimensions, structures, shapes and proportions of the various elements, values of parameters, mounting arrangements, use of materials, colors, orientations can occur without materially departing from the teachings and advantages of the subject matter disclosed herein. For example, elements shown as integrally formed can be constructed of multiple parts or elements, the position of elements can be reversed or otherwise varied, and the nature or number of discrete elements or positions can be altered or varied. Other substitutions, modifications, changes and omissions can also be made in the design, operating conditions and arrangement of the disclosed elements and operations without departing from the scope of the present disclosure.

For example, a computer system 300 described in FIG. 3 can be used in conjunction with, instead of, or together with systems 400 or 700 or their system components, and vice versa. Further relative parallel, perpendicular, vertical or other positioning or orientation descriptions include variations within +/−10% or +/−10 degrees of pure vertical, parallel or perpendicular positioning. References to "approximately," "substantially" or other terms of degree include variations of +/−10% from the given measurement, unit, or range unless explicitly indicated otherwise. Coupled elements can be electrically, mechanically, or physically coupled with one another directly or with intervening elements. Scope of the systems and methods described herein is thus indicated by the appended claims, rather than the foregoing description, and changes that come within the meaning and range of equivalency of the claims are embraced therein.

What is claimed is:

1. A system, comprising:
    at least one processor coupled with memory to:
        identify a state of charge (SOC) of a battery of an electric vehicle, a temperature threshold for a temperature of the battery and a gradient threshold for a difference in temperature between at least two cells of the battery;
        determine, using a model, a flow rate of coolant and a temperature of the coolant to apply for a duration of a charge event of the battery based at least on the SOC, the temperature of the battery and the difference in temperature input into the model for cooling the battery, the flow rate of coolant and the temperature of the coolant determined by the model to maintain the temperature of the battery below the temperature threshold and the difference in temperature below the gradient threshold for the duration of the charge event; and
        cool the battery based on the flow rate of coolant and the temperature of the coolant determined by the model to maintain the temperature below the temperature threshold and to maintain the difference in temperature below the gradient threshold for the duration of the charge event.

2. The system of claim 1 comprising the at least one processor to:
    identify a target SOC to achieve at an end of the charge of the battery;
    determine the flow of coolant and the temperature of the coolant to apply during the charge of the battery to achieve the target SOC;
    determine a time during the charge of the battery at which to apply the flow of coolant and the temperature of the coolant to minimize a duration of the charge of the battery; and
    provide to the battery, during the charge of the battery, the flow of coolant and the temperature of the coolant-cooling at the determined time to achieve the target SOC at the end of the charge of the battery.

3. The system of claim 1, comprising the at least one processor to:
    determine the flow of coolant and the temperature of the coolant based at least on a type of the coolant to apply during the charge;
    determine a time at which to provide the flow of the coolant at the temperature of the coolant during the charge of the battery; and
    provide to the battery, at the determined time, the flow of the coolant of the determined type of the coolant at the temperature of the coolant determined by the model.

4. The system of claim 1, comprising the at least one processor to:
    determine the flow of coolant and the temperature of the coolant based at least on a temperature of the coolant to apply during the charge; and
    cause a cooler to provide, during the charge of the battery, the flow of coolant at the temperature of the coolant determined by the model.

5. The system of claim 1, comprising the at least one processor to:
    determine, via the model, a time to provide the flow of coolant and the temperature of the coolant to the battery to minimize a duration of the charge of the battery; and
    cause a cooler to provide to the battery the coolant at the time determined using the model.

6. The system of claim 1, comprising the at least one processor to:
    receive from a battery management system a setpoint corresponding to the flow of coolant and the temperature of the coolant for a cell of the at least two cells; and
    determine the flow of coolant and the temperature of the coolant based at least on the setpoint.

7. The system of claim 1, wherein the at least two cells of the battery comprise a first cell of a plurality of cells of the battery having a first temperature that is lower than each temperature of each other cell of the plurality of cells and a second cell of the plurality of cells having a second temperature that is higher than each temperature of the each other cell of the plurality of cells of the battery.

8. The system of claim 1, comprising the at least one processor to:
    determine an amount of current at which to charge the battery based at least on the flow of coolant and the temperature of the coolant; and
    set the current at which to charge the battery according to the determined flow of coolant and the temperature of the coolant.

9. A method, comprising:
    identifying, by one or more processors coupled with memory, a state of charge (SOC) of a battery of an electric vehicle, a temperature threshold for a temperature of the battery and a gradient threshold for a difference in temperature between at least two cells of the battery;

determining, by the one or more processors using a model, a flow of coolant and a temperature of the coolant to apply for a duration of a charge of the battery based at least on the SOC, the temperature of the battery and the difference in temperature input into the model for cooling the battery, the flow rate of coolant and the temperature of the coolant determined by the model to maintain the temperature of the battery below the temperature threshold and the difference in temperature below the gradient threshold for the duration of the charge event;

cooling, by the one or more processors, to the battery based on the flow rate of coolant and the temperature of the coolant cooling determined by the model; and maintaining, by the one or more processors, the temperature of the battery below the temperature threshold and the difference in temperature between the at least two cells of the battery below the gradient threshold for the duration of the charge event.

10. The method of claim 9, comprising:
identifying, by the one or more processors, a target SOC to achieve at the end of the charge of the battery;
determining, by the one or more processors, the flow of coolant and the temperature of the coolant to apply during the charge of the battery to achieve the target SOC;
determining, by the one or more processors, a time during the charge of the battery at which to apply the flow of coolant and the temperature of the coolant to minimize a duration of the charge of the battery; and
providing, by the one or more processors, to the battery the flow of coolant and the temperature of the coolant at the determined time during the charge of the battery to achieve the target SOC at the end of the charge of the battery.

11. The method of claim 9, comprising:
determining, by the one or more processors, the flow of coolant and the temperature of the coolant based at least on a type of the coolant to apply during the charge;
determining, by the one or more processors, a time at which to provide the flow of the coolant at the temperature of the coolant during the charge of the battery; and
providing, by the one or more processors, to the battery the flow of the coolant of the determined type of the coolant at the temperature of the coolant determined by the model at the determined time during the charge of the battery.

12. The method of claim 9, comprising:
determining, by the one or more processors, the flow of coolant and the temperature of the coolant based at least on a temperature of the coolant to apply during the charge; and
cause, by the one or more processors, a cooler to provide to the battery, during the charge of the battery, the flow of coolant and the temperature of the coolant at the temperature of the coolant determined by the model.

13. The method of claim 9, comprising:
determining, by the one or more processors, using the model, a time to provide the flow of coolant and the temperature of the coolant to the battery; and
cause, by the one or more processors, the cooler to provide to the battery the flow of coolant at the time determined using the model.

14. The method of claim 9, comprising:
receiving, by the one or more processors, from a battery management system a setpoint corresponding to the flow of coolant and the temperature of the coolant for a cell of the at least two cells; and
determining, by the one or more processors, the flow of coolant and the temperature of the coolant based at least on the setpoint.

15. The method of claim 9, wherein the at least two cells of the battery comprise a first cell of a plurality of cells of the battery having a first temperature that is lower than each temperature of each other cell of the plurality of cells and a second cell of the plurality of cells having a second temperature that is higher than each temperature of the each other cell of the plurality of cells of the battery.

16. The method of claim 9, comprising:
determining, by the one or more processors, an amount of current at which to charge the battery based at least on the flow of coolant and the temperature of the coolant; and
setting, by the one or more processors, the current at which to charge the battery according to the determined flow of coolant and the temperature of the coolant.

17. A non-transitory computer-readable media having processor readable instructions, such that, when executed, cause at least one processor to:
identify a state of charge (SOC) of a battery of an electric vehicle, a temperature threshold for a temperature of the battery and a gradient threshold for a difference in temperature between at least two cells of the battery;
determine a flow rate of coolant and a temperature of the coolant to apply for a duration of a charge of the battery based at least on the SOC, the temperature of the battery and the difference in temperature input into the model for cooling the battery, the flow rate of coolant and the temperature of the coolant determined by the model to maintain the temperature below the temperature of the battery threshold and the difference in temperature below the gradient threshold for the duration of the charge event; and
provide to the battery the flow rate of coolant and the temperature of the coolant determined by the model to maintain the temperature below the temperature threshold and to maintain the difference in temperature below the gradient threshold for the duration of the charge event.

18. The non-transitory computer-readable media of claim 17, comprising the instructions, such that, when executed, cause at least one processor to:
identify a target SOC to achieve;
determine the flow of coolant and the temperature of the coolant to apply during the charge to achieve the target SOC; and
provide to the battery the flow of coolant and the temperature of the coolant determined by the model during the charge to achieve the target SOC.

19. The non-transitory computer-readable media of claim 17, comprising the instructions, such that, when executed, cause at least one processor to:
determine the flow rate of coolant and the temperature of the coolant based at least on a type of the coolant to apply during the charge; and
provide to the battery the flow of the coolant of the determined type of the coolant at the temperature of the coolant determined by the model during the charge of the battery.

20. The non-transitory computer-readable media of claim 17, comprising the instructions, such that, when executed, cause at least one processor to:

determine the the flow of coolant and the temperature of the coolant based at least on a temperature of the coolant to apply during the charge; and cause a cooler to provide to the battery the flow of the coolant at the temperature of the coolant determined by the model during the charge of the battery.

\* \* \* \* \*